US009835909B2

(12) United States Patent
Sakaigawa

(10) Patent No.: US 9,835,909 B2
(45) Date of Patent: *Dec. 5, 2017

(54) DISPLAY DEVICE HAVING CYCLICALLY-ARRAYED SUB-PIXELS

(71) Applicant: Japan Display Inc., Tokyo (JP)

(72) Inventor: Akira Sakaigawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/394,679

(22) Filed: Dec. 29, 2016

(65) Prior Publication Data

US 2017/0108747 A1    Apr. 20, 2017

Related U.S. Application Data

(63) Continuation of application No. 14/711,013, filed on May 13, 2015, now Pat. No. 9,558,700.

(30) Foreign Application Priority Data

May 16, 2014 (JP) .................... 2014-102869

(51) Int. Cl.
*G02F 1/1343* (2006.01)
*G02F 1/1362* (2006.01)
(Continued)

(52) U.S. Cl.
CPC ...... *G02F 1/134336* (2013.01); *G02F 1/1368* (2013.01); *G02F 1/136286* (2013.01);
(Continued)

(58) Field of Classification Search
CPC ......... G02F 1/134336; G02F 1/136286; G02F 1/1368; G02F 1/13624; G02F 2201/52;
(Continued)

(56) References Cited

U.S. PATENT DOCUMENTS 8,552,635 B2    10/2013   Kim et al.
8,624,943 B2     1/2014   Noguchi et al.
(Continued)

FOREIGN PATENT DOCUMENTS

CN    100570449 C    12/2009
CN    102063865 A     5/2011
(Continued)

OTHER PUBLICATIONS

Taiwanese Office Action dated May 11, 2016, for corresponding Taiwanese Application No. 104115445.
(Continued)

*Primary Examiner* — Tracie Y Green
(74) *Attorney, Agent, or Firm* — Michael Best & Friedrich LLP

(57) ABSTRACT

In a display device, first and second sub pixels arranged in juxtaposition between adjacent scan lines are lined alternately in a column direction in at least one of first and third columns of sub pixels; at least one of third and fourth sub pixels is arranged between adjacent scan lines in at least one of second and fourth columns of sub pixels; the first, second, third, and fourth sub pixels are included in an identical row of pixels and the first, second, third, and fourth columns of sub pixels; and a first pixel that is in an identical row of pixels and includes sub pixels of the first and second columns includes a sub pixel not present in a second pixel that is adjacent to the first pixel in a row direction and is included in the third and fourth columns.

20 Claims, 14 Drawing Sheets

(51) Int. Cl.
  *G02F 1/1368* (2006.01)
  *G09G 3/36* (2006.01)
(52) U.S. Cl.
  CPC .............. *G02F 1/13624* (2013.01); *G02F 2001/134345* (2013.01); *G02F 2201/40* (2013.01); *G02F 2201/52* (2013.01); *G09G 3/3607* (2013.01); *G09G 3/3648* (2013.01); *G09G 2300/0426* (2013.01); *G09G 2300/0452* (2013.01); *G09G 2300/0465* (2013.01)
(58) Field of Classification Search
  CPC .... G02F 2201/40; G02F 2001/134345; G09G 3/3648; G09G 3/3607; G09G 2300/0426; G09G 2300/0465; G09G 2300/0452
  See application file for complete search history.

(56) References Cited

U.S. PATENT DOCUMENTS

| | | | |
|---|---|---|---|
| 9,478,772 B2* | 10/2016 | Sato | .............. H01L 51/5209 |
| 9,558,700 B2* | 1/2017 | Sakaigawa | ........... G09G 3/3625 |
| 2005/0270444 A1 | 12/2005 | Miller et al. | |
| 2007/0002084 A1 | 1/2007 | Kimura et al. | |
| 2008/0084376 A1 | 4/2008 | Hirota et al. | |
| 2009/0140253 A1 | 6/2009 | Kasahara | |
| 2011/0181635 A1 | 7/2011 | Kabe et al. | |
| 2015/0035738 A1 | 2/2015 | Hirota et al. | |
| 2015/0331291 A1* | 11/2015 | Sakaigawa | ........... G09G 3/3625 349/43 |
| 2016/0155777 A1* | 6/2016 | Kabe | ...................... H01L 27/32 257/89 |
| 2016/0260401 A1* | 9/2016 | Sakaigawa | ........... G09G 3/3607 |

FOREIGN PATENT DOCUMENTS

| | | |
|---|---|---|
| JP | 2007-041578 A | 2/2007 |
| JP | 2008-502004 A | 1/2008 |
| JP | 2008-096549 A | 4/2008 |
| JP | 2011-154323 A | 8/2011 |
| JP | 2014-041366 A | 3/2014 |
| KR | 10-2006-0082104 A | 7/2006 |
| KR | 10-2008-0032618 A | 4/2008 |
| TW | 2008-34167 A | 8/2008 |

OTHER PUBLICATIONS

Korean Office Action dated Apr. 18, 2016, for corresponding Korean Application No. 10-2015-0067409.
Chinese Office Action dated Feb. 27, 2017 for corresponding Chinese Patent Application No. 201510245786.8.
Japanese Office Action dated Oct. 3, 2017, for corresponding Japanese Application No. 2014-102869.

* cited by examiner

FIG.7

| | DISPLAY DATA | | PANEL DRIVE ORDER |
|---|---|---|---|
| 1st ROW<br>2nd ROW | R(1,1)G(1,1)B(1,1)R(1,2)G(1,2)W(1,2)···<br>R(2,1)G(2,1)W(2,1)R(2,2)G(2,2)B(2,2)··· | 1st ROW<br>2nd ROW | R(1,1)B(1,1)R(1,2)W(1,2)···<br>R(2,1)G(1,1)W(2,1)R(2,2)G(1,2)B(2,2)··· |
| ... | | m-th ROW<br>m+1st ROW | R(m,1)G(m-1,1)B(m,1)R(m,2)G(m-1,2)W(m,2)···<br>R(m+1,1)W(m,1)G(m,1)R(m+1,2)G(m,2)B(m+1,2)··· |
| p-th ROW | R(p,1)G(p,1)W(p,1)R(p,2)G(p,2)B(p,2)···<br>(p: FINAL ROW (p IS EVEN NUMBER)) | p-th ROW<br>p+1st ROW | R(p,1)G(p-1,1)W(p,1)R(p,2)G(p-1,2)B(p,2)···<br>G(p,1)G(p,2)··· |

FIG.15

| | DISPLAY DATA | | PANEL DRIVE ORDER |
|---|---|---|---|
| 1st ROW<br>2nd ROW | R(1,1)G(1,1)W(1,1)B(1,1)G(1,2)W(1,2)…<br>B(2,1)G(2,1)W(2,1)R(2,2)G(2,2)W(2,2)… | 1st ROW<br>2nd ROW | R(1,1)W(1,1)B(1,1)W(1,2)…<br>B(2,1)G(1,1)W(2,1)R(2,2)G(1,2)W(2,2)… |
| ⋮ | ⋮ | m-th ROW<br>m+1st ROW | R(m,1)G(m-1,1)W(m,1)B(m,2)G(m-1,2)W(m,2)…<br>B(m+1,1)G(m,1)W(m+1,1)R(m+1,2)G(m,2)W(m+1,2)… |
| p-th ROW | B(p,1)G(p,1)W(p,1)R(p,2)G(p,2)W(p,2)…<br>(p: FINAL ROW (p IS EVEN NUMBER)) | p-th ROW<br>p+1st ROW | B(p,1)G(p-1,1)W(p,1)R(p,2)G(p-1,2)W(p,2)…<br>G(p,1)G(p,2)… |

DISPLAY DEVICE HAVING CYCLICALLY-ARRAYED SUB-PIXELS

CROSS-REFERENCE TO RELATED APPLICATIONS

The present application is a Continuation of application Ser. No. 14/711,013, filed May 13, 2015, and claims priority from Japanese Application No. 2014-102869, filed on May 16, 2014, the contents of which are incorporated by reference herein in their entirety.

BACKGROUND

1. Technical Field

The present invention relates to display devices.

2. Description of the Related Art

In recent years, demand for display devices in mobile devices such as cellular phones and electronic paper has been increasing. In a display device, a single pixel includes a plurality of sub pixels and the sub pixels each emit light in colors different from one another, and by switching the display of the respective sub pixels on and off, various colors are displayed with one pixel. In such a display device, display characteristics such as resolution and luminance have been improved year after year. However, as the resolution becomes higher, a numerical aperture decreases. Hence, there are problems in that it needs to increase the luminance of a backlight when trying to achieve high luminance, and whereby the power consumption of the backlight increases. To improve the situation, there has been a technology that adds white pixels that are the fourth sub pixel, in addition to the conventional sub pixels of red, green, and blue (see Japanese Patent Application Laid-open Publication No. 2011-154323 (JP-A-2011-154323)). This technology decreases the value of current for the backlight as much as the white pixels improve the luminance, and thus reduces the power consumption. When the value of current for the backlight is not decreased, because the luminance is improved by the white pixels, by using this, the visibility under the outdoor daylight can be improved.

The technology disclosed in JP-A-2011-154323 describes a display device that includes an image display panel composed of pixels each composed of a first sub pixel, a second sub pixel, a third sub pixel, and a fourth sub pixel and arrayed in a two-dimensional matrix, and a signal processor that receives an input signal and outputs an output signal. In JP-A-2011-154323, FIGS. 2, 22, and 23 illustrate the arrays of the first sub pixels, the second sub pixels, the third sub pixels, and the fourth sub pixels. In the pixel arrays disclosed in JP-A-2011-154323, however, the numerical aperture may be reduced as pixel density becomes higher.

For the foregoing reasons, there is a need for a display device in which first sub pixels, second sub pixels, third sub pixels and fourth sub pixels are arranged and in which pixel density cam become higher.

SUMMARY

According to an aspect, a display device includes: a display unit in which pixels including three sub pixels out of a first sub pixel, a second sub pixel, a third sub pixel, and a fourth sub pixel are arranged and in which a first column of the sub pixels, a second column of the sub pixels arrayed next to the first column, a third column of the sub pixels arrayed next to the second column, and a fourth column of the sub pixels arrayed next to the third column are cyclically arrayed; a plurality of signal lines extending in a column direction that lies along at least one of the first column, the second column, the third column, and the fourth column; and a plurality of scan lines extending in a row direction that intersects with the column direction. The first sub pixel and the second sub pixel arranged in juxtaposition between the adjacent scan lines are lined alternately in the column direction in at least one of the first column and the third column. At least one of the third sub pixel and the fourth sub pixel is arranged between the adjacent scan lines in at least one of the second column and the fourth column. The first sub pixel, the second sub pixel, the third sub pixel, and the fourth sub pixel are included in an identical row of the pixels and in the first column, the second column, the third column, and the fourth column. A first pixel that is in an identical row of the pixels and includes sub pixels of the first column and the second column includes a sub pixel not present in a second pixel that is adjacent to the first pixel in the row direction and is included in the third column and the fourth column.

BRIEF DESCRIPTION OF THE DRAWINGS

FIG. 7 is a table for explaining panel drive of the display device in the embodiment;

FIG. 15 is a table for explaining panel drive of the display device in the first modification of the embodiment;

DETAILED DESCRIPTION

With reference to the accompanying drawings, a mode to implement the invention (an embodiment) will be described in detail. The content of the following exemplary embodiments described is not intended to limit the scope of the invention. The constituent elements described in the following include those that a person skilled in the art can easily assume or that are substantially the same. The constituent elements described in the following can further be combined as appropriate. Note that the disclosure is a mere example in any case, and appropriate modifications retaining the spirit of the invention that a person skilled in the art can easily assume are naturally included within the scope of the invention. Although the drawings may be schematically illustrated in terms of width, thickness, shape, and others of parts as compared with the actual modes to further clarify the explanation, the drawings are examples anyway and are not intended to limit the interpretation of the invention. In the description and each of the drawings, the constituent elements the same as those previously described concerning the previously described drawings are given the same reference symbols or numerals and their detailed explanations may be omitted as appropriate.

Figure 1:
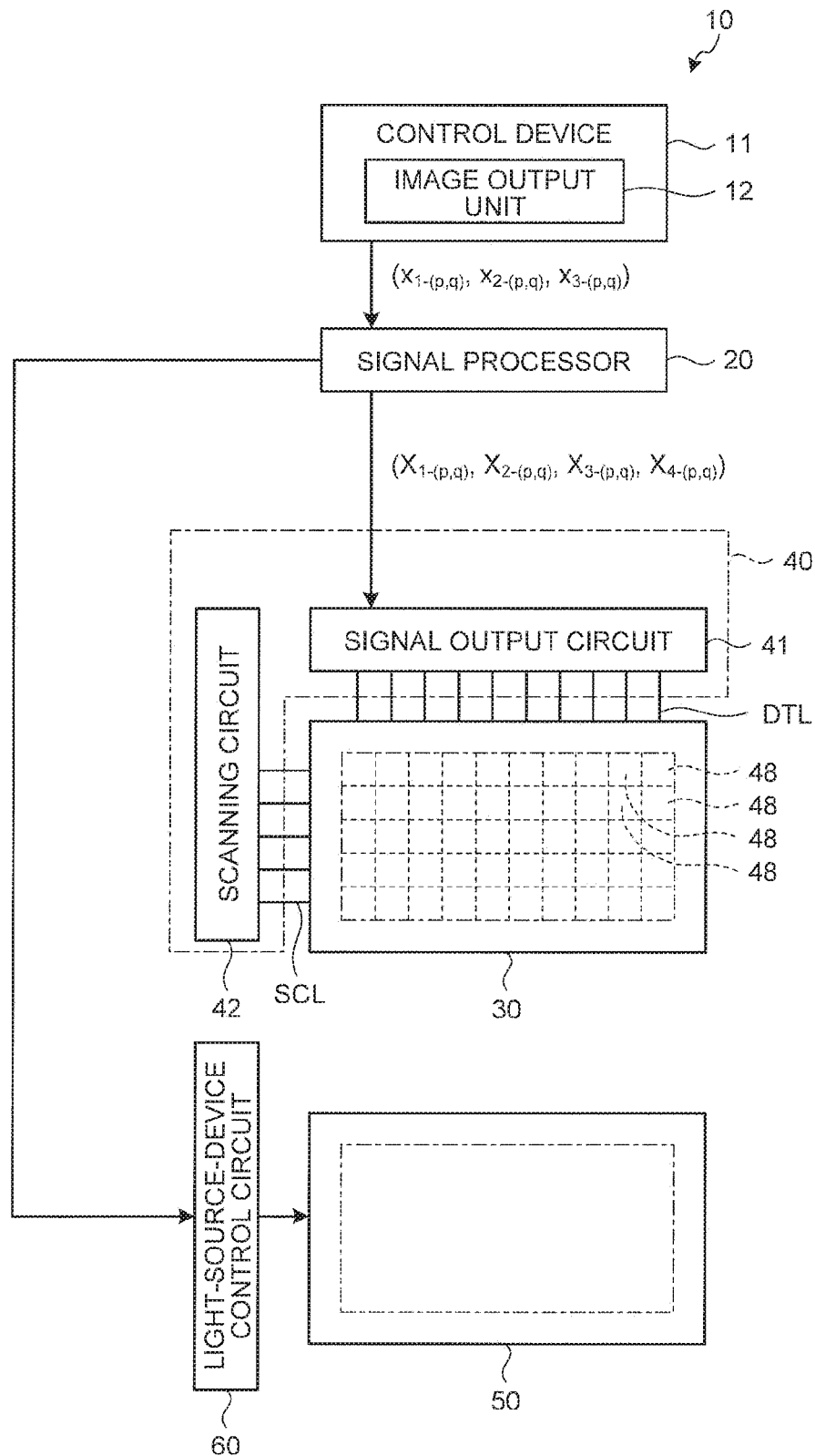
FIG. 1 is a block diagram illustrating one example of a configuration of a display device according to an embodiment.
Figure 2:
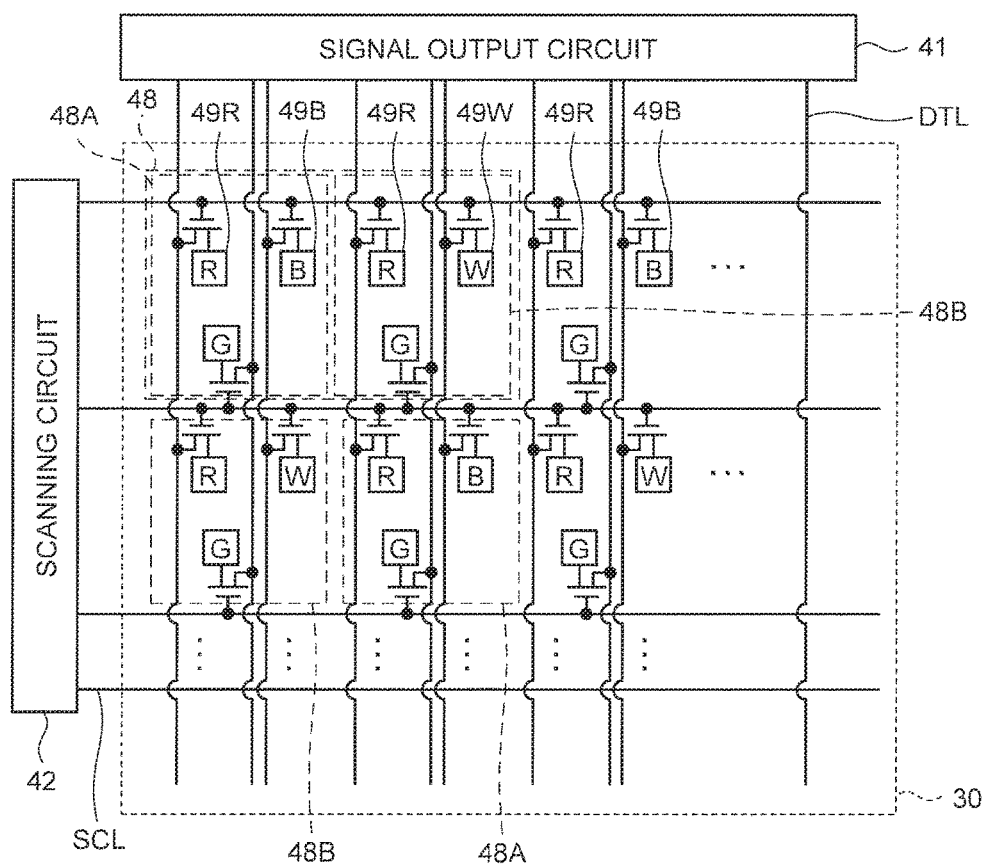
FIG. 2 is a conceptual diagram of an image display panel and an image-display-panel drive circuit in the embodiment.
Figure 3:
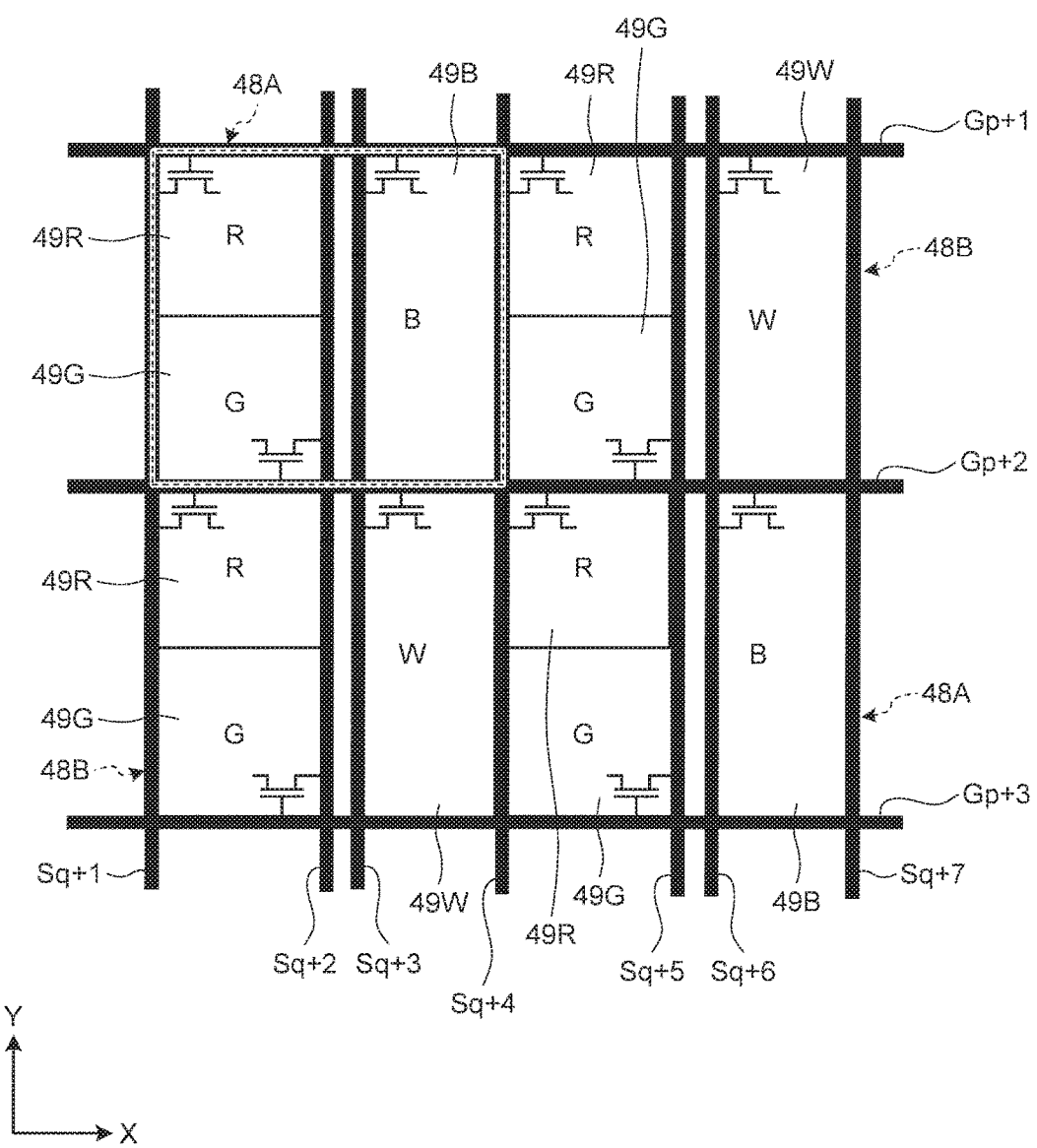
FIG. 3 is an explanatory diagram illustrating a pixel array of the image display panel in the embodiment.
Figure 4:
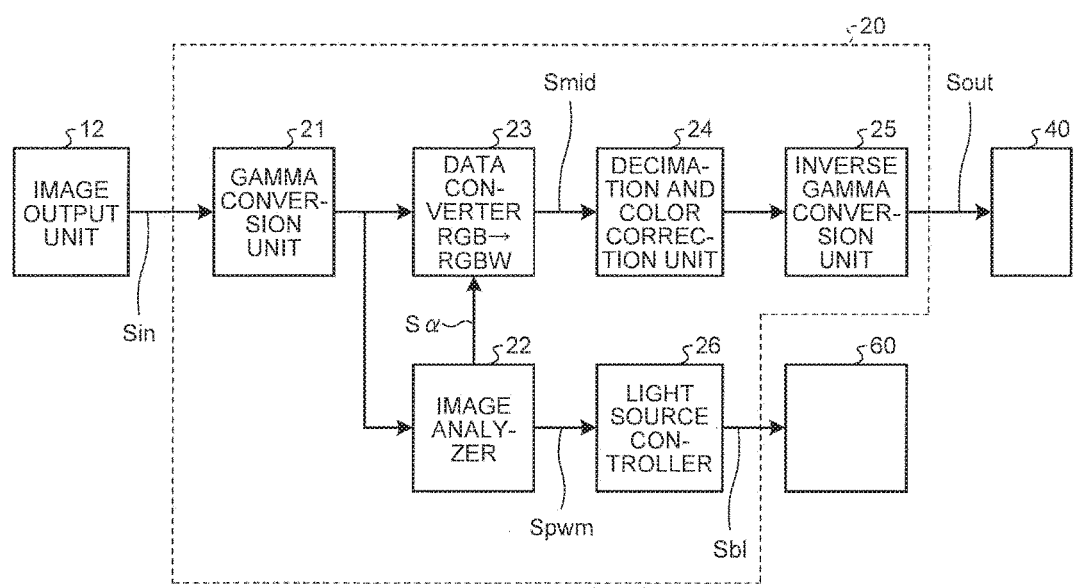
FIG. 4 is a block diagram for explaining a signal processor of the display device in the embodiment.

FIG. 1 is a block diagram illustrating one example of a configuration of a display device according to an embodiment. FIG. 2 is a diagram illustrating a pixel array of the image display panel in the embodiment. FIG. 3 is a conceptual diagram of an image display panel and an image-display-panel drive circuit in the embodiment. FIG. 4 is a block diagram for explaining a signal processor of the display device in the embodiment.

As illustrated in FIG. 1, a display device 10 includes a signal processor 20 that receives an input signal (RGB data) from an image output unit 12 of a control device 11 and executes predetermined data conversion processing on the signal to be output, an image display panel 30 that displays an image based on an output signal output from the signal processor 20, an image-display-panel drive circuit 40 that controls driving of the image display panel 30 (display unit), a light source device 50 that illuminates the image display panel 30 from its back surface, and a light-source-device control circuit 60 that controls driving of the light source device 50.

The signal processor 20 is an arithmetic processor that controls the operation of the image display panel 30 and the light source device 50. The signal processor 20 is coupled to the image-display-panel drive circuit 40 for driving the image display panel 30 and the light-source-device control circuit 60 for driving the light source device 50. The signal processor 20 processes an input signal received from the outside and generates an output signal Sout and a light-source device control signal Spwm. That is, the signal processor 20 converts and generates the input signal into an output signal composed of color components of a first color, a second color, a third color, and a fourth color, and outputs the generated output signal to the image display panel 30. The signal processor 20 outputs the generated output signal to the image-display-panel drive circuit 40 and outputs the generated light-source device control signal to the light-source-device control circuit 60. The foregoing processing of color conversion by the signal processor 20 is one example in any case, and is not intended to limit the interpretation of the invention.

As illustrated in FIGS. 2 and 3, in the image display panel 30, with a pixel 48A and a pixel 48B as a pair of pixels, pixels 48 of $P_0 \times Q_0$ pieces ($P_0$ pieces in the row direction and $Q_0$ pieces in the column direction) are arrayed in a two-dimensional matrix. The example illustrated in FIGS. 2 and 3 is an example in which the pixels 48A and the pixels 48B provided in plurality are arrayed alternately in the row direction and in the column direction in a two-dimensional coordinate system of X and Y, and the pixels 48 are arrayed in a matrix. In this example, the row direction is an X direction and the column direction is a Y direction.

As illustrated in FIG. 3, the pixel 48A includes, out of a first sub pixel 49R, a second sub pixel 49G, a third sub pixel 49B, and a fourth sub pixel 49W, three of the first sub pixel 49R, the second sub pixel 49G, and the third sub pixel 49B. The pixel 48B includes, out of the first sub pixel 49R, the second sub pixel 49G, the third sub pixel 49B, and the fourth sub pixel 49W, three of the first sub pixel 49R, the second sub pixel 49G, and the fourth sub pixel 49W. The image display panel 30 includes scan lines Gp+1, Gp+2, and Gp+3 extending in the X direction and signal lines Sq+1, Sq+2, Sq+3, Sq+4, Sq+5, Sq+6, and Sq+7 extending in the Y direction.

As illustrated in FIG. 3, a first column, a second column arrayed next to the first column, a third column arrayed next to the second column, and a fourth column arrayed next to the third column are cyclically arrayed in the X direction. In the first column and the third column, the first sub pixel 49R and the second sub pixel 49G, which are both arranged between the adjacent scan line Gp+1 and the scan line Gp+2, are lined alternately in the Y direction. In the second column and the fourth column, either the third sub pixel 49B or the fourth sub pixel 49W is arranged between the adjacent scan line Gp+1 and the scan line Gp+2, and the third sub pixel 49B and the fourth sub pixel 49W are lined alternately in the Y direction. The third sub pixel 49B and the fourth sub pixel 49W are also arranged alternately in the second column and the fourth column in the row direction.

The scan line Gp+1 is coupled to a switching element (not depicted) of the second sub pixel 49G that is one of the first sub pixel 49R and the second sub pixel 49G in the pixel 48B, and is coupled to a switching element of the first sub pixel 49R that is one of the first sub pixel 49R and the second sub pixel 49G in the pixel 48A of the next row. The scan line Gp+1 is further coupled to a switching element of the third sub pixel 49B of the second column in the pixel 48A and a switching element of the fourth sub pixel 49W of the fourth column in the pixel 48B. The switching element of the third sub pixel 49B may be coupled not to the scan line Gp+1 but to the scan line Gp+2. The switching element of the fourth sub pixel 49W of the fourth column may be coupled not to the scan line Gp+1 but to the scan line Gp+2.

The scan line Gp+2 is coupled to the switching element of the second sub pixel 49G that is one of the first sub pixel 49R and the second sub pixel 49G in the pixel 48A, and is coupled to the switching element of the first sub pixel 49R that is one of the first sub pixel 49R and the second sub pixel 49G in the pixel 48B in the next row. The scan line Gp+2 is further coupled to the switching element of the third sub pixel 49B of the fourth column in the pixel 48A, and to that of the second sub pixel 49W of the fourth column in the pixel 48B.

The scan line Gp+3 is coupled to the switching element of the second sub pixel 49G that is one of the first sub pixel 49R and the second sub pixel 49G in the pixel 48B, and is coupled to the switching element (not depicted) of the first sub pixel 49R that is one of the first sub pixel 49R and the second sub pixel 49G in the pixel 48A in the next row. The scan line Gp+3 is further coupled to the third sub pixel 49B of the fourth column in the pixel 48A, and to the fourth sub pixel 49W of the second column in the pixel 48B.

As just described, out of three of the first sub pixel 49R, the second sub pixel 49G, and the third sub pixel 49B included in a single pixel 48A, the second sub pixel 49G is coupled to a scan line different from that of the other sub pixels. Out of three of the first sub pixel 49R, the second sub pixel 49G, and the fourth sub pixel 49W included in a single pixel 48B, the second sub pixel 49G is coupled to a scan line different from that of the other sub pixels.

That is, the scan line to which the first sub pixel 49R, which is one of the first sub pixel 49R and the second sub pixel 49G included in a single pixel 48A, and the third sub pixel 49B included in that pixel 48A are coupled is different from the scan line to which the second sub pixel 49G, which is the other included in that pixel, is coupled. The scan line to which the first sub pixel 49R, which is one of the first sub pixel 49R and the second sub pixel 49G included in a single pixel 48B, and the fourth sub pixel 49W included in that pixel 48B are coupled is different from the scan line to which the second sub pixel 49G, which is the other included in that pixel, is coupled.

The signal line Sq+1 is coupled to the switching elements of the first sub pixels 49R of the first column. The signal line Sq+2 is coupled to the switching elements of the second sub pixels 49G of the first column. The signal line Sq+3 is coupled to the switching elements of the third sub pixels 49B and the fourth sub pixels 49W of the second column. The signal line Sq+4 is coupled to the switching elements of the first sub pixels 49R of the third column. The signal line Sq+5 is coupled to the switching elements of the second sub pixels 49G of the third column. The signal line Sq+6 is coupled to the switching elements of the third sub pixels 49B and the fourth sub pixels 49W of the fourth column. The signal line Sq+7 is the same as the signal line Sq+1. The distance between the signal line Sq+2 and the signal line Sq+1 is greater than the distance between the signal line Sq+2 and the signal line Sq+3. Thus, the distance between the signal line Sq+2 and the signal line Sq+1 is different from the distance between the signal line Sq+2 and the signal line Sq+3. In the same manner, the distance between the signal line Sq+5 and the signal line Sq+4 is greater than the distance between the signal line Sq+5 and the signal line Sq+6. Thus, the distance between the signal line Sq+5 and the signal line Sq+4 is different from the distance between the signal line Sq+5 and the signal line Sq+6.

By this configuration, between the sub pixels 49 of the first column and the sub pixels 49 of the second column, two of the signal line Sq+2 and the signal line Sq+3 are arranged. Between the sub pixels 49 of the third column and the sub pixels 49 of the fourth column, two of the signal line Sq+5 and the signal line Sq+6 are arranged. The fourth sub pixel 49W is of luminance higher than the first sub pixel 49R and the second sub pixel 49G are, and the influence of an effective aperture width on the luminance is smaller than that of the first sub pixel 49R and the second sub pixel 49G. Thus, by making the effective aperture widths of the first sub pixel 49R and the second sub pixel 49G in the row direction (X direction) larger than the effective aperture width of the fourth sub pixel 49W, the numerical apertures of the first sub pixel 49R and the second sub pixel 49G can be increased. In the column direction (Y direction), the third sub pixel 49B and the fourth sub pixel 49W are arranged alternately. Consequently, the effective aperture widths of the first sub pixel 49R and the second sub pixel 49G in the row direction (X direction) are larger than the effective aperture width of the third sub pixel 49B. The effective aperture width of the third sub pixel 49B in the column direction (Y direction) is larger than the effective aperture width of the first sub pixel 49R or the second sub pixel 49G. Thus, the luminance of the third sub pixel 49B that displays the third color component, which has a lower visual sensitivity of human as compared with the first sub pixel 49R and the second sub pixel 49G, can be supplemented. The luminance of the fourth sub pixel 49W can further supplement the luminance of the third sub pixel 49B. As just described, it is desirable that two of the signal line Sq+2 and the signal line Sq+3 be biased toward the fourth sub pixel 49W side. In the same manner, it is desirable that the wiring arrangement of two of the signal line Sq+5 and the signal line Sq+6 be biased toward the fourth sub pixel 49W side. Thus, it is desirable that the wiring arrangement of the two of the signal line Sq+2 and the signal line Sq+3 and the two of the signal line Sq+5 and the signal line Sq+6 be biased toward the high luminance side.

The pixel 48 includes the first sub pixels 49R, the second sub pixels 49G, the third sub pixel 49B, and the fourth sub pixel 49W. The first sub pixel 49R displays a first color component (for example, red as the first primary color). The second sub pixel 49G displays a second color component (for example, green as the second primary color). The third sub pixel 49B displays a third color component (for example, blue as the third primary color). The fourth sub pixel 49W displays a fourth color component (for example, white). In the following description, when it is not necessary to distinguish the first sub pixel 49R, the second sub pixel 49G, the third sub pixel 49B, and the fourth sub pixel 49W individually, they are referred to as sub pixels 49. The above-described image output unit 12 outputs, as an input signal to the signal processor 20, RGB data that can be displayed by the first color component, the second color component, and the third color component in the pixel 48. The first color component, the second color component, the third color component, and the fourth component are not limited to the primary colors and may be complementary colors.

As illustrated in FIG. 3, the pixels 48A and the pixels 48B are arranged alternately in the row direction (X direction) and in the column direction (Y direction). The arrangement of the pixels 48A and the pixels 48B is not limited to this. For example, while the pixels 48A and the pixels 48B are arranged alternately in the row direction (X direction), the pixels 48A may be arranged continuously in the column direction (Y direction) and the pixels 48B may be arranged continuously in the column direction (Y direction). Alternatively, while the pixels 48A and the pixels 48B are arranged alternately in the column direction (Y direction), the pixels 48A may be arranged continuously in the row direction (X direction) and the pixels 48B may be arranged continuously in the row direction (X direction). In any of the arrangements of the pixels 48A and the pixels 48B, the number of third sub pixels 49B and the number of fourth sub pixels 49W are equal in two pixels in the row direction (X direction) and in two pixels in the column direction (Y direction), and thus the color can be balanced even when the third color component is replaced with the fourth color component. Even in other pixel arrangements, if the arrangement of the pixels 48A and the pixels 48B are made such that the number of third sub pixels 49B and the number of fourth sub pixels 49W are equal in four pixels in the row direction (X direction) and in four pixels in the column direction (Y direction), the color can be balanced even when the third color component is replaced with the fourth color component.

The display device 10 is, more specifically, a transmissive color liquid crystal display device. The image display panel 30 is a color liquid crystal display panel, and a first color filter that lets the first primary color pass through is arranged between the first sub pixels 49R and an image viewer, a second color filter that lets the second primary color pass through is arranged between the second sub pixels 49G and the image viewer, and a third color filter that lets the third primary color pass through is arranged between the third sub pixels 49B and the image viewer. In the image display panel 30, no color filter is arranged between the fourth sub pixels 49W and the image viewer. For the fourth sub pixels 49W, a transparent resin layer may be provided in place of a color filter. As just described, in the image display panel 30, by providing the transparent resin layer, the occurrence of a large step at the fourth sub pixels 49W by not providing a color filter for the fourth sub pixels 49W can be suppressed. The display device 10 may be a display device that lights its light-emitting body such as an organic light emitting diode (OLED).

As illustrated in FIG. 4, the signal processor 20 includes a gamma conversion unit 21 that receives an input signal Sin (RGB data) from the image output unit 12, and an image analyzer 22, a data converter 23, a decimation and color correction unit 24, an inverse gamma conversion unit 25, and a light source controller 26. The gamma conversion unit 21 performs gamma conversion processing on the input signal Sin (RGB data). The image analyzer 22 calculates, based on the input value after the gamma conversion processing, control information Sa for an extension coefficient α, which will be described later, and calculates, based on the extension coefficient α, the light-source device control signal Spwm. The light source controller 26 controls the light-source-device control circuit 60 by a control signal Sb1 based on the light-source device control signal Spwm.

The data converter 23 determines and outputs, based on the input values for which gamma conversion has been performed and the control information Sa for the extension coefficient α, an intermediate output signal Smid for each of the sub pixels 49 in all of the pixels 48. The decimation and color correction unit 24 performs decimation processing so as to make the signal fit the pixel array of the image display panel 30 and performs color correction. For example, the decimation and color correction unit 24 performs, on display data to be displayed on the pixel 48A including color information on the first color component, the second color component, the third color component, and the fourth color component, the processing of decimating the information on the fourth color component that is not displayable on the pixel 48A. In the same manner, the decimation and color correction unit 24 performs, on the display data to be displayed on the pixel 48B including the color information on the first color component, the second color component, the third color component, and the fourth color component, the processing of decimating the information on the third color component that is not displayable on the pixel 48B. Alternatively, the decimation and color correction unit 24 decimates the information on the fourth color component from the display data to be displayed on the pixel 48A including the color information on the first color component, the second color component, the third color component, and the fourth color component. In addition, the decimation and color correction unit 24 performs correction processing to add the information on the fourth color component that is not displayable on the pixel 48A to the display data to be displayed on the adjacent pixel 48B. In the same manner, the decimation and color correction unit 24 decimates the information on the third color component from the display data to be displayed on the pixel 48B including the color information on the first color component, the second color component, the third color component, and the fourth color component. The decimation and color correction unit 24 further performs correction processing to add the information on the third color component that is not displayable on the pixel 48B to the display data to be displayed on the adjacent pixel 48A. The inverse gamma conversion unit 25 inputs, to the image-display-panel drive circuit 40, the output signal Sout in which inverse gamma conversion has been performed based on the processing information on the decimation and color correction unit 24. The gamma conversion processing 21 and the inverse gamma conversion unit 25 are not essential, and the gamma conversion processing and the inverse gamma conversion processing may not be performed.

The image-display-panel drive circuit 40 includes a signal output circuit 41 and a scanning circuit 42. In the image-display-panel drive circuit 40, the signal output circuit 41 holds video signals to be sequentially output to the image display panel 30. The signal output circuit 41 is electrically coupled to the image display panel 30 via wiring DTL. In the image-display-panel drive circuit 40, the scanning circuit 42 controls ON/OFF of a switching element (for example, a thin film transistor (TFT)) for controlling an operation of the sub pixel (light transmittance) in the image display panel 30. The scanning circuit 42 is electrically coupled to the image display panel 30 via wiring SCL.

The light source device 50 is arranged on a back surface of the image display panel 30, and illuminates the image display panel 30 by irradiating the image display panel 30 with light. The light source device 50 irradiates the entire surface of the image display panel 30 with light to illuminate the image display panel 30. The light-source-device control circuit 60 controls irradiation light quantity and the like of the light output from the light source device 50. Specifically, the light-source-device control circuit 60 adjusts a voltage or a duty ratio to be supplied to the light source device 50 based on the light-source-device control signal output from the signal processor 20 to control the light quantity (light intensity) of the light with which the image display panel 30 is irradiated. The following describes a processing operation executed by the display device 10, more specifically, the signal processor 20.

Figure 5:
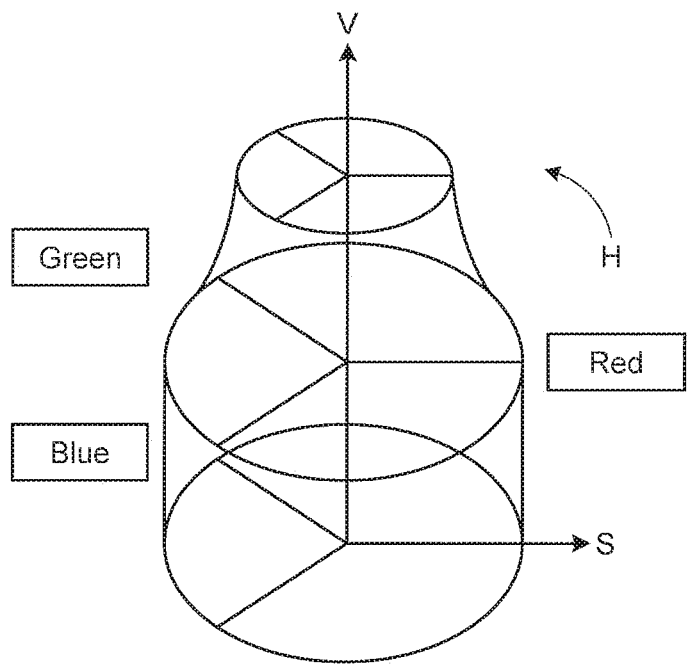
FIG. 5 is a conceptual diagram of an extended HSV color space extendable by the display device in the embodiment.
Figure 6:
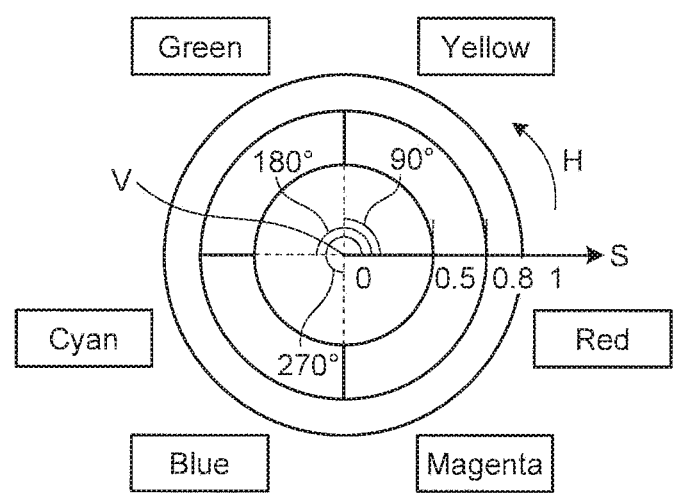
FIG. 6 is a conceptual diagram illustrating the relation between the hue and saturation in the extended HSV color space.

FIG. 5 is a conceptual diagram of an extended HSV color space extendable by the display device according to the embodiment. FIG. 6 is a conceptual diagram illustrating a relation between the hue and saturation in the extended HSV color space. The signal processor 20 receives an input signal that is information of an image to be displayed input from the outside. The input signal includes the information of the image (color) to be displayed at its position for each pixel as the input signal. Specifically, in the image display panel 30 in which $P_0 \times Q_0$ pixels 48 are arranged in a matrix, with respect to the (p,q)-th pixel 48 (where $1 \le p \le P_0$, $1 \le q \le Q_0$), the signal processor 20 receives a signal including an input signal of the first sub pixel 49R the signal value of which is $x_{1-(p,q)}$, an input signal of the second sub pixel 49G the signal value of which is $x_{2-(p,q)}$, and an input signal of the third sub pixel 49B the signal value of which is $x_{3-(p,q)}$ (refer to FIG. 1).

The signal processor 20 illustrated in FIG. 1 generates, by processing the input signal, an output signal of first sub pixels (signal value $X_{1-(p,q)}$) to determine the display gradation of the first sub pixels 49R, an output signal of second sub pixels (signal value $X_{2-(p,q)}$) to determine the display gradation of the second sub pixels 49G, an output signal of third sub pixels (signal value $X_{3-(p,q)}$) to determine the display gradation of the third sub pixels 49B, and an output signal of fourth sub pixels (signal value $X_{4-(p,q)}$) to determine the display gradation of the fourth sub pixels 49W, and outputs the signals to the image-display-panel drive circuit 40.

The display device 10, as illustrated in FIG. 5, can expand the dynamic range of brightness in an HSV color space (extended HSV color space), by providing the fourth sub pixels 49W that output the fourth color component (for example, white) in the pixels 48. That is, as illustrated in FIG. 5, it is in a shape in which, in an HSV color space in a columnar shape that can be displayed on the first sub pixel 49R, the second sub pixel 49G, and the third sub pixel 49B, a solid in an approximately trapezoidal shape for which a maximum of the value V (also referred to as brightness) becomes low as the saturation S increases is placed.

The signal processor 20 stores therein maximum values Vmax(S) of brightness with the saturation S as a variable in the HSV color space which has been expanded by adding the fourth color component (for example, white). That is, the signal processor 20 stores therein the maximum values Vmax(S) of brightness for respective coordinates (values) of the saturation and hue concerning the solid shape of the HSV color space illustrated in FIG. 5. Because the input signal includes input signals of the first sub pixel 49R, the second sub pixel 49G, and the third sub pixel 49B, the HSV color space of the input signal is in a columnar shape, that is, the same shape as the columnar shape portion of the extended HSV color space.

The signal processor 20 then calculates an output signal of the first sub pixels 49R (signal value $X_{1-(p,q)}$) based on at least the input signal (signal value $x_{1-(p,q)}$) and the extension coefficient α of the first sub pixels 49R, and outputs it to the first sub pixels 49R. The signal processor 20 calculates an output signal of the second sub pixels 49G (signal value $X_{2-(p,q)}$) based on at least the input signal (signal value $x_{2-(p,q)}$) and the extension coefficient α of the second sub pixels 49G, and outputs it to the second sub pixels 49G. The signal processor 20 calculates an output signal of the third sub pixels 49B (signal value $X_{3-(p,q)}$) based on at least the input signal (signal value $x_{3-(p,q)}$) and the extension coefficient α of the third sub pixels 49B, and outputs it to the third sub pixels 49B. The signal processor 20 further calculates an output signal of the fourth sub pixels 49W (signal value $X_{4-(p,q)}$) based on the input signal of the first sub pixels 49R (signal value $x_{1-(p,q)}$) based on the input signal of the second sub pixels 49G (signal value $x_{2-(p,q)}$) and the input signal of the third sub pixels 49B (signal value $x_{3-(p,q)}$), and outputs it to the fourth sub pixels 49W.

Specifically, the signal processor 20 calculates the output signal of the first sub pixels 49R based on the extension coefficient α of the first sub pixels 49R and the output signal of the fourth sub pixels 49W, calculates the output signal of the second sub pixels 49G based on the extension coefficient α of the second sub pixels 49G and the output signal of the fourth sub pixels 49W, and calculates the output signal of the third sub pixels 49B based on the extension coefficient α of the third sub pixels 49B and the output signal of the fourth sub pixels 49W.

That is, assuming that χ is a constant dependent of the display device 10, the signal processor 20 obtains, from the following Expression (1) to Expression (3), the signal value $X_{1-(p,q)}$ that is the output signal of the first sub pixels 49R, the signal value $X_{2-(p,q)}$ that is the output signal of the second sub pixels 49G, and the signal value $X_{3-(p,q)}$ that is the output signal of the third sub pixels 49B, for the (p,q)-th pixel (or a combination of the first sub pixel 49R, the second sub pixel 49G, and the third sub pixel 49B).

$$X_{1-(p,q)} = \alpha \cdot x_{1-(p,q)} - \chi \cdot X_{4-(p,q)} \tag{1}$$

$$X_{2-(p,q)} = \alpha \cdot x_{2-(p,q)} - \chi \cdot X_{4-(p,q)} \tag{2}$$

$$X_{3-(p,q)} = \alpha \cdot x_{3-(p,q)} - \chi \cdot X_{4-(p,q)} \tag{3}$$

The signal processor 20 obtains the maximum value Vmax(S) of brightness with the saturation S, as a variable, in the HSV color space expanded by adding the fourth color, and obtains the saturation S and brightness V(S) in a plurality of pixels based on the input signal values of the sub pixels in those pixels. The signal processor 20 then determines the extension coefficient α such that the ratio of the pixels, for which the extended brightness value obtained by the product of the brightness V(S) and the extension coefficient α exceeds the maximum value Vmax(S), to the total pixels is equal to or smaller than a limit value β (Limit value). The limit value β is, with respect to a maximum of brightness in the extended HSV color space, an upper limit (ratio) of the ratio of width in which the combination of the values of hue and saturation exceeds the maximum.

The saturation S and the brightness V(S) are expressed by S=(Max−Min)/Max and V(S)=Max, respectively. The saturation S can assume the value of 0 to 1, and the brightness V(S) can assume the value of 0 to $(2^n-1)$, in which the n is the number of display gradation bits. The Max is a maximum value of the input signal values of three sub pixels, which are the input signal value of the first sub pixel, the input signal value of the second sub pixel, and the input signal value of the third sub pixel, to a pixel. The Min is a minimum value of the input signal values of three sub pixels, which are the input signal value of the first sub pixel, the input signal value of the second sub pixel, and the input signal value of the third sub pixel, to the pixel. The hue H is represented by 0° to 360° as illustrated in FIG. 6. From 0° toward 360°, it represents red, yellow, green, cyan, blue, magenta, and red. In the embodiment, the region including an angle of 0° is defined as red, the region including an angle of 120° is defined as green, and the region including an angle of 240° is defined as blue.

According to the embodiment, the signal value $X_{4-(p,q)}$ can be obtained based on a product of $Min_{(p,q)}$ and the expansion coefficient α. Specifically, the signal value $X_{4-(p,q)}$ can be obtained based on the following Expression (4). In Expression (4), the product of $Min_{(p,q)}$ and the expansion coefficient α is divided by χ. However, the embodiment is not limited thereto. χ will be described later. The expansion coefficient α is determined for each image display frame.

$$X_{4-(p,q)} = Min_{(p,q)} \cdot \alpha / \chi \tag{4}$$

Generally, in the (p,q)-th pixel, the saturation $S_{(p,q)}$ and the brightness $V(S)_{(p,q)}$ in the cylindrical HSV color space can be obtained from the following Expressions (5) and (6) based on the input signal (signal value $x_{1-(p,q)}$) of the first sub pixel 49R, the input signal (signal value $x_{2-(p,q)}$) of the second sub pixel 49G, and the input signal (signal value $x_{3\text{-}(p,q)}$) of the third sub pixel 49B.

$$S_{(p,q)} = (Max_{(p,q)} - Min_{(p,q)})/Max_{(p,q)} \quad (5)$$

$$V(S)_{(p,q)} = Max_{(p,q)} \quad (6)$$

In the above expressions, $Max_{(p,q)}$ represents the maximum value among the input signal values of three sub pixels 49 ($x_{1\text{-}(p,q)}$, $x_{2\text{-}(p,q)}$, and $x_{3\text{-}(p,q)}$), and $Min_{(p,q)}$ represents the minimum value among the input signal values of the three sub pixels 49 ($x_{1\text{-}(p,q)}$, $x_{2\text{-}(p,q)}$, and $x_{3\text{-}(p,q)}$). In the embodiment, n is assumed to be 8. That is, the display gradation bit number is assumed to be 8 bits (a value of the display gradation is assumed to be 256 gradations, that is, 0 to 255).

It is assumed that no color filter is arranged for the fourth sub pixels 49W that display white. Furthermore, when a signal having a value equivalent to a maximum signal value of the output signal of the first sub pixels is input to the first sub pixels 49R, a signal having a value equivalent to a maximum signal value of the output signal of the second sub pixels is input to the second sub pixels 49G, and a signal having a value equivalent to a maximum signal value of the output signal of the third sub pixels is input to the third sub pixels 49B, the luminance of the aggregate of the first sub pixels 49R, the second sub pixels 49G, and the third sub pixels 49B provided in the pixel 48 or a group of pixels 48 is defined as $BN_{1\text{-}3}$. When a signal having a value equivalent to a maximum signal value of the output signal of the fourth sub pixel 49W is input to the fourth sub pixels 49W provided in the pixel 48 or a group of pixels 48, the luminance of the fourth sub pixels 49W is defined as $BN_4$. That is, the white of maximum luminance is displayed by the aggregate of the first sub pixels 49R, the second sub pixels 49G, and the third sub pixels 49B, and the luminance of this white is expressed by $BN_{1\text{-}3}$. Consequently, assuming that $\chi$ is a constant dependent of the display device 10, the constant $\chi$ is expressed by $\chi = BN_4/BN_{1\text{-}3}$.

Specifically, the luminance $BN_4$ when the input signal having a value of display gradation 255 is assumed to be input to the fourth sub pixel 49W is 1.5 times the luminance $BN_{1\text{-}3}$ of white when the input signals having values of display gradation such as the signal value $x_{1\text{-}(p,q)}=255$, the signal value $x_{2\text{-}(p,q)}=255$, and the signal value $x_{3\text{-}(p,q)}=255$, are input to the aggregate of the first sub pixel 49R, the second sub pixel 49G, and the third sub pixel 49B. That is, $\chi$ is 1.5 in the embodiment.

If the signal value $X_{4\text{-}(p,q)}$ is given by Expression (4) above, Vmax(S) can be represented by the following Expressions (7) and (8).

When $S \leq S_0$, $$V\max(S) = (\chi+1) \cdot (2^n - 1) \quad (7)$$

When $S_0 < S \leq 1$, $$V\max(S) = (2^n - 1) \cdot (1/S) \quad (8)$$

In this case, $S_0 = 1/(\chi+1)$.

The thus obtained maximum value Vmax(S) of the brightness using the saturation S as a variable in the HSV color space expanded by adding the fourth color component is stored in the signal processor 20 as a kind of look-up table, for example. Alternatively, the signal processor 20 obtains the maximum value Vmax(S) of the brightness using the saturation S as a variable in the expanded HSV color space as occasion demands.

Next, the following describes a method of obtaining the signal values $X_{1\text{-}(p,q)}$, $X_{2\text{-}(p,q)}$, $X_{3\text{-}(p,q)}$, and $X_{4\text{-}(p,q)}$ as output signals of the (p,q)-th pixel 48 (expansion processing). The following processing is performed to keep a ratio among the luminance of the first primary color displayed by (first sub pixel 49R+fourth sub pixel 49W), the luminance of the second primary color displayed by (second sub pixel 49G+fourth sub pixel 49W), and the luminance of the third primary color displayed by (third sub pixel 49B+fourth sub pixel 49W). The processing is performed to also keep (maintain) color tone. In addition, the processing is performed to keep (maintain) a gradation-luminance characteristic (gamma characteristic, γ characteristic). When all of the input signal values are 0 or smaller in any one of the pixels 48 and a group of the pixels 48, the expansion coefficient α may be obtained without including such pixel 48 or a group of pixels 48.

First Process

First, the signal processor 20 obtains the saturation S and the brightness V(S) in the pixels 48 based on the input signal values of the sub pixels 49 of the pixels 48. Specifically, $S_{(p,q)}$ and $V(S)_{(p,q)}$ are obtained from Expressions (5) and (6) based on the signal value $x_{1\text{-}(p,q)}$ that is the input signal of the first sub pixel 49R, the signal value $x_{2\text{-}(p,q)}$ that is the input signal of the second sub pixel 49G, and the signal value $x_{3\text{-}(p,q)}$ that is the input signal of the third sub pixel 49B, each of those signal values being input to the (p,q)-th pixel 48. The signal processor 20 performs this processing on all of the pixels 48.

Second Process

Next, the signal processor 20 obtains the expansion coefficient α(s) based on the Vmax(S)/V(S) obtained in the pixels 48.

$$\alpha(s) = V\max(S)/V(S) \quad (9)$$

Then arranged are values of expansion coefficient α(s) obtained in the pixels (all of $P_0 \times Q_0$ pixels in the embodiment) 48 in ascending order, and it is assumed that the expansion coefficient α(s) corresponding to a range from the minimum value to $\beta \times P_0 \times Q_0$ is the expansion coefficient α among the values of the $P_0 \times Q_0$ expansion coefficients α(s). In this way, the expansion coefficient α can be determined so that a ratio of the pixel in which the expanded value of the brightness obtained by multiplying the brightness V(S) by the expansion coefficient α exceeds the maximum value Vmax(S) to all the pixels is equal to or smaller than a predetermined value (β).

Third Process

Next, the signal processor 20 obtains the signal value $X_{4\text{-}(p,q)}$ in the (p,q)-th pixel 48 based on at least the signal value $x_{1\text{-}(p,q)}$, the signal value $x_{2\text{-}(p,q)}$, and the signal value $x_{3\text{-}(p,q)}$ of the input signals. In the embodiment, the signal processor 20 determines the signal value $X_{4\text{-}(p,q)}$ based on $Min_{(p,q)}$, the expansion coefficient α, and the constant $\chi$. More specifically, as described above, the signal processor 20 obtains the signal value $X_{4\text{-}(p,q)}$ based on Expression (4). The signal processor 20 obtains the signal value $X_{4\text{-}(p,q)}$ for all of the $P_0 \times Q_0$ pixels 48.

Fourth Process

Subsequently, the signal processor 20 obtains the signal value $X_{1\text{-}(p,q)}$ in the (p,q)-th pixel 48 based on the signal value $x_{1\text{-}(p,q)}$, the expansion coefficient α, and the signal value $X_{4\text{-}(p,q)}$, obtains the signal value $X_{2\text{-}(p,q)}$ in the (p,q)-th pixel 48 based on the signal value $x_{2\text{-}(p,q)}$, the expansion coefficient α, and the signal value $X_{4\text{-}(p,q)}$, and obtains the signal value $X_{3\text{-}(p,q)}$ in the (p,q)-th pixel 48 based on the signal value $x_{3\text{-}(p,q)}$, the expansion coefficient α, and the signal value $X_{4\text{-}(p,q)}$. Specifically, the signal processor 20 obtains the signal value $X_{1\text{-}(p,q)}$, the signal value $X_{2\text{-}(p,q)}$, and the signal value $X_{3\text{-}(p,q)}$ in the (p,q)-th pixel 48 based on Expressions (1) to (3) described above.

The signal processor 20 expands a value of $\text{Min}_{(p,q)}$ with α as represented by Expression (4). In this way, the value of $\text{Min}_{(p,q)}$ is expanded by α, so that the luminance of the white display sub pixel (fourth sub pixel 49W) increases, and the luminance of the red, green and blue display sub pixels (corresponding to the first, second, and third sub pixels 49R, 49G, and 49B, respectively) also increases as represented by the above expressions. Due to this, dullness of color can be prevented. That is, the luminance of the entire image is multiplied by α because the value of $\text{Min}_{(p,q)}$ is expanded by α, compared with the case in which the value of $\text{Min}_{(p,q)}$ is not expanded. Accordingly, for example, a static image and the like can be preferably displayed with high luminance.

The luminance displayed by the output signals $X_{1\text{-}(p,q)}$, $X_{2\text{-}(p,q)}$, $X_{3\text{-}(p,q)}$, and $X_{4\text{-}(p,q)}$ in the (p,q)-th pixel 48 is expanded α times the luminance formed by the input signals $x_{1\text{-}(p,q)}$, $x_{2\text{-}(p,q)}$, and $x_{3\text{-}(p,q)}$. Accordingly, the display device 10 may reduce the luminance of the pixel in the light source device 50 based on the expansion coefficient α so as to cause the luminance to be the same as that of the pixel 48 that is not expanded. Specifically, the luminance of the light source device 50 may be multiplied by (1/α).

As described above, the display device 10 according to the embodiment sets the limit value (Limit value) β for each frame of the input signals so as to set the expansion coefficient to a value that allows power consumption to be reduced while maintaining the display quality.

Panel Drive

FIG. 7 is a table for explaining panel drive of the display device in the embodiment. FIG. 7 illustrates the display data of the intermediate output signal Smid that is output by the data converter 23 illustrated in FIG. 4, and the display data corresponding to the order of panel drive that is the output signal Sout processed by the decimation and color correction unit 24. In FIG. 7, a single row represents a unit of row of respective sub pixels distinguished by the first sub pixel 49R or the second sub pixel 49G lined in the column direction of the sub pixels. As illustrated in FIGS. 2 and 3, the scanning circuit 42, as a control device, transmits an image signal to be transmitted to the second sub pixels 49G in the first column and the third column by shifting by one horizontal line of pixels (one row) from the image signal to be transmitted to the first sub pixels 49R of the same pixels 48A and pixels 48B in which the second sub pixel 49G is present. The decimation and color correction unit 24 illustrated in FIG. 4 performs decimation and color correction to shift the image signal to be transmitted to the second sub pixels 49G in the first column and the third column by one horizontal line of pixels (one row) from the image signal to be transmitted to the first sub pixels 49R of the same pixels 48A and pixels 48B in which the second sub pixel 49G is present.

As in the foregoing, the switching element of the third sub pixel 49B can be coupled to either the scan line Gp+1 or the scan line Gp+2. The switching element of the fourth sub pixel 49W of the fourth column can be coupled to either the scan line Gp+1 or the scan line Gp+2. When the switching element of the third sub pixel 49B and the switching element of the fourth sub pixel 49W of the fourth column are coupled to the scan line Gp+2, it is necessary to shift the display data of G(1,1) equivalent to the second sub pixel 49G and B(1,1) equivalent to the third sub pixel 49B out of the first pixel (1,1), and thus the storage capacity of a memory that temporarily stores therein the display data G(1,1) and B(1,1) is necessary. In contrast, when the switching element of the third sub pixel 49B and the switching element of the fourth sub pixel 49W of the fourth column are coupled to the scan line Gp+1 as illustrated in FIG. 7, it only needs to shift the display data of G(1,1) equivalent to the second sub pixel 49G out of the first pixel (1,1), and thus the storage capacity of a memory that temporarily stores therein the display data G(1,1) can be reduced. Consequently, in the display device 10 in the embodiment, it is more preferable that the switching element of the third sub pixel 49B and the switching element of the fourth sub pixel 49W of the fourth column be coupled to the scan line Gp+1.

As in the foregoing, the display device 10 in the embodiment includes the image display panel 30 that includes the pixels 48A and the pixels 48B including three sub pixels 49 out of the first sub pixel 49R, the second sub pixel 49G, the third sub pixel 49B, and the fourth sub pixel 49W, and in which the first column, the second column arrayed next to the first column, the third column arrayed next to the second column, and the fourth column arrayed next to the third column are cyclically arrayed. The image display panel 30, as a display unit, includes a plurality of signal lines Sq+1, Sq+2, Sq+3, Sq+4, Sq+5, Sq+6, and Sq+7 extending in the column direction (Y direction) that lies along at least one of the first column, the second column, the third column, and the fourth column, and a plurality of scan lines Gp+1, Gp+2, and Gp+3 extending in the row direction (X direction) that intersects with the column direction.

In the image display panel 30, in at least one of the first column and the third column, the first sub pixel 49R and the second sub pixel 49G arranged in juxtaposition between the adjacent scan line Gp+1 and the scan line Gp+2 are lined alternately in the column direction, and in at least one of the second column and the fourth column, at least one of the third sub pixel 49B and the fourth sub pixel 49W is arranged between the adjacent scan line Gp+1 and the scan line Gp+2. An identical row of pixels and the first column, the second column, the third column, and the fourth column of sub pixels include the first sub pixel 49R, the second sub pixel 49G, the third sub pixel 49B, and the fourth sub pixel 49W, and the pixel 48A (first pixel) that is the identical row of pixels and includes the sub pixels of the first column and the second column includes the third sub pixel 49B that is not present in the pixel 48B (second pixel) that is adjacent to the pixel 48A in the row direction and included in the third column and the fourth column. The identical row of pixels means the row divided by the scan lines, or the row in units of the third sub pixel 49B or the fourth sub pixel 49W the numerical aperture of which has a larger numerical value.

Figure 8:
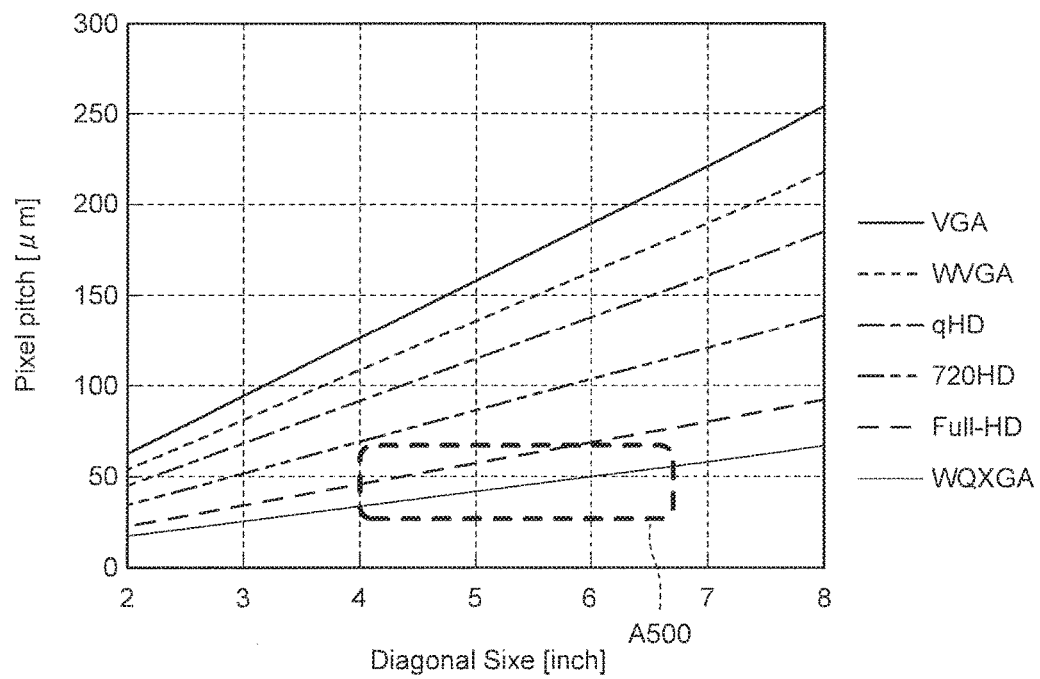
FIG. 8 is an explanatory chart illustrating the relation between the resolution and the diagonal length of a sub pixel.
Figure 9:
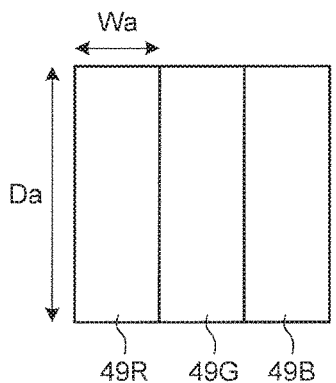
FIG. 9 is a diagram for explaining the size of a pixel according to a first comparative example.

FIG. 8 is an explanatory chart illustrating the relation between the resolution and the diagonal length of a sub pixel. The ordinate axis represents the resolution, the abscissa axis represents the diagonal length of a sub pixel, and an area of 500 pixels per inch (ppi, the number of pixels per inch) is indicated as A500. In FIG. 8, the VGA indicates the resolution in a state in which one pixel for display is arranged in a matrix of 640 by 480 pixels. The WVGA indicates the resolution in a state in which one pixel for display is arranged in a matrix of 800 by 480 pixels. The qHD (quarter HD) indicates the resolution in a state in which one pixel for display is arranged in a matrix of 960 by 540 pixels. The 720HD indicates the resolution in a state in which one pixel for display is arranged in a matrix of 1280 by 720 pixels. The Full-HD indicates the resolution in a state in which one pixel for display is arranged in a matrix of 1920 by 1080 pixels. The WQXGA indicates the resolution in a state in which one pixel for display is arranged in a matrix of 2560 by 1600 pixels. FIG. 9 is a diagram for explaining the size of a pixel according to a first comparative example.

Figure 10:
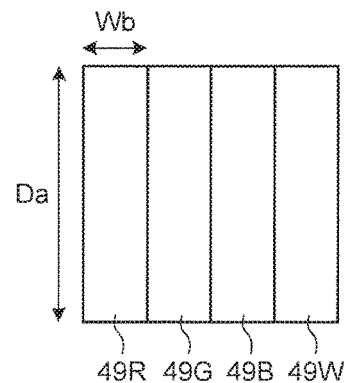
FIG. 10 is a diagram for explaining the size of a pixel according to a second comparative example.
Figure 11:
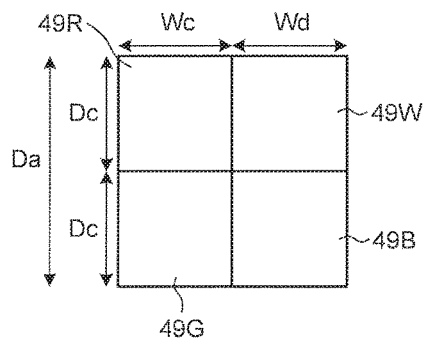
FIG. 11 is a diagram for explaining the size of a pixel according to a third comparative example.
Figure 12:
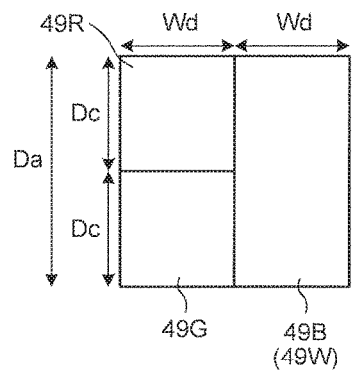
FIG. 12 is a diagram for explaining the size of a pixel in the embodiment.

FIG. 10 is a diagram for explaining the size of a pixel according to a second comparative example. FIG. 11 is a diagram for explaining the size of a pixel according to a third comparative example. FIG. 12 is a diagram for explaining the size of a pixel in the embodiment. In the pixel illustrated in FIG. 10 that includes the first sub pixel, the second sub pixel, the third sub pixel, and the fourth sub pixel, as compared in the same 500 ppi area, the aperture area Wb×Da is small with respect to the aperture area Wa×Da of a sub pixel in the pixel illustrated in FIG. 9 that includes the first sub pixel, the second sub pixel, and the third sub pixel. In the pixel in the second comparative example illustrated in FIG. 10, as compared with the pixel in the first comparative example illustrated in FIG. 9, it may not be possible to ensure the numerical aperture when the pixel density is high.

In contrast, the pixel illustrated in FIG. 11 is of a square pixel, and thus the lengths Wc and Wd can be ensured and the numerical aperture can be improved more than that of the pixel illustrated in FIG. 10. While the pixel illustrated in FIG. 11 can be driven by increasing the number of signal lines without increasing the number of scan lines, the numerical aperture decreases because more signal lines are required than those of the pixel in the embodiment. The increase in signal lines results in a growth in the signal output circuit and is undesirable. Meanwhile, in the pixel illustrated in FIG. 11, when the number of scan lines is increased, the drive frequency increases (for example, two-fold) and the power consumption may increase. Consequently, according to the pixel disclosed in FIG. 18 in the above-described JP-A-2011-154323, although the length in the row direction can be made greater than that of the pixel in the second comparative example illustrated in FIG. 10, the respective apertures of the first sub pixel, the second sub pixel, the third sub pixel, and the fourth sub pixel are made in irregular shapes in practice to adjust the white chromaticity point, and thus the increase in pixel density has limitations.

As illustrated in FIG. 12, in the pixel in the embodiment, as in the foregoing, an identical row of pixels and the first column, the second column, the third column, and the fourth column of sub pixels include the first sub pixels 49R, the second sub pixels 49G, the third sub pixel 49B, and the fourth sub pixel 49W, and the pixel 48A (first pixel) that is the identical row of pixels and includes the sub pixels of the first column and the second column includes the third sub pixel 49B that is not present in the pixel 48B (second pixel) that is adjacent to the pixel 48A in the row direction and included in the third column and the fourth column. The ratio of a single first sub pixel 49R and a single third sub pixel 49B is the same as that of a single second sub pixel 49G and a single fourth sub pixel 49W. Consequently, the aperture area of the first sub pixel 49R is Dc×Wd, the aperture area of the second sub pixel 49G is Dc×Wd, and the aperture area of the third sub pixel 49B or the fourth sub pixel 49W is Da×Wd. As illustrated in FIG. 12, in the pixel in the embodiment, when two of the adjacent pixel 48A and the pixel 48B are added, the respective areas of the first sub pixels 49R, the second sub pixels 49G, the third sub pixel 49B, and the fourth sub pixel 49W are Da×Wd=2×Dc×Wd, and thus the white chromaticity point can be adjusted. As in the foregoing, when two of the pixel 48A and the pixel 48B in the embodiment are combined, the first sub pixels 49R, the second sub pixels 49G, the third sub pixel 49B, and the fourth sub pixel 49W included in the identical row of pixels and the first column, the second column, the third column, and the fourth column of sub pixels have the same area. Furthermore, because the apertures are not necessary to be in irregular shapes, the display device 10 in the embodiment has excellent mass productivity and reduces cost. In the display device 10 in the embodiment, because the pixel pitch is to be large, flaws can be reduced. Furthermore, in the sub pixels 49 in the embodiment, because the pixel pitch is large, the viewing-angle color mixture is suppressed.

Because the pixels 48A and 48B in the embodiment are both arranged between the adjacent scan line Gp+1 and the scan line Gp+2, an increase in scan lines can be suppressed, and thus an increase in drive frequency can be suppressed. Consequently, the display device 10 in the embodiment yields low power consumption.

First Modification

Figure 13:
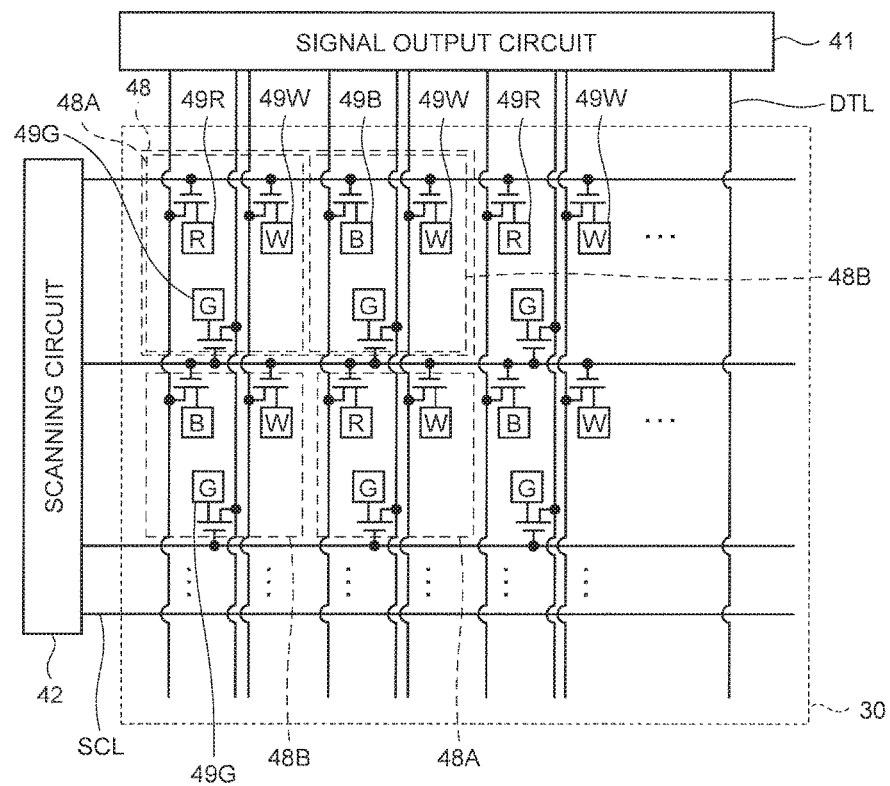
FIG. 13 is a conceptual diagram of an image display panel and an image-display-panel drive circuit according to a first modification of the embodiment.
Figure 14:
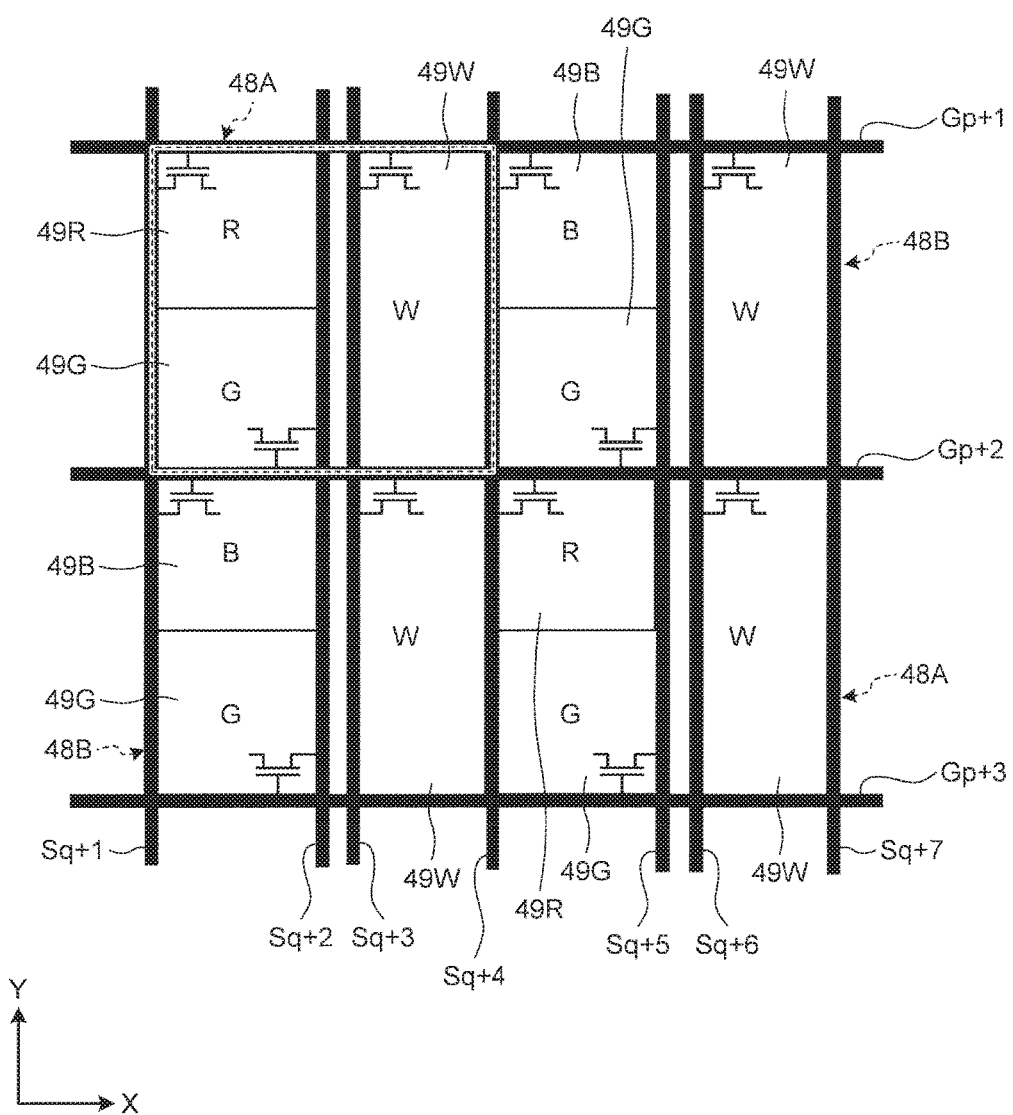
FIG. 14 is a diagram illustrating a pixel array of the image display panel in the first modification of the embodiment.

FIG. 13 is a conceptual diagram of an image display panel and an image-display-panel drive circuit according to a first modification of the embodiment. FIG. 14 is a diagram illustrating a pixel array of the image display panel in the first modification of the embodiment. FIG. 15 is a table for explaining panel drive of the display device in the first modification of the embodiment. For the constituent elements the same as those in the foregoing, the detailed explanations will be omitted.

As illustrated in FIGS. 13 and 14, the pixel 48A includes, out of the first sub pixel 49R, the second sub pixel 49G, the third sub pixel 49B, and the fourth sub pixel 49W, three of the first sub pixel 49R, the second sub pixel 49G, and the fourth sub pixel 49W. The pixel 48B includes, out of the first sub pixel 49R, the second sub pixel 49G, the third sub pixel 49B, and the fourth sub pixel 49W, three of the second sub pixel 49G, the third sub pixel 49B, and the fourth sub pixel 49W. The image display panel 30 includes the scan lines Gp+1, Gp+2, and Gp+3 extending in the X direction and the signal lines Sq+1, Sq+2, Sq+3, Sq+4, Sq+5, Sq+6, and Sq+7 extending in the Y direction. An identical row of pixels and the first column, the second column, the third column, and the fourth column of sub pixels include the first sub pixel 49R, the second sub pixel 49G, the third sub pixel 49B, and the fourth sub pixel 49W, and the pixel 48A (first pixel) that is the identical row of pixels and includes the sub pixels of the first column and the second column includes the first sub pixel 49R that is not present in the pixel 48B (second pixel) that is adjacent to the pixel 48A in the row direction and included in the third column and the fourth column. That is, because the pixel 48A and the pixel 48B comparably include pixels of green component of high visual sensitivity and of white component, the display quality can be enhanced.

The fourth sub pixel 49W has higher luminance than that of the first sub pixel 49R, the second sub pixel 49G, and the third sub pixel 49B. The second sub pixel 49G has higher luminance than that of the first sub pixel 49R and the third sub pixel 49B. Consequently, as illustrated in FIGS. 13 and 14, the pixel 48A and the pixel 48B are arranged such that the area of the second sub pixel 49G, which has the highest luminance of the first sub pixel 49R, the second sub pixel 49G, and the third sub pixel 49B, is larger when the areas of the sub pixels 49 occupying two of the pixels are compared. Such arrangement ensures the area of the sub pixels 49 of high luminance and makes deterioration in transmissive resolution difficult to see.

As illustrated in FIGS. 13 and 14, the first column, the second column arrayed next to the first column, the third column arrayed next to the second column, and the fourth column arrayed next to the third column are cyclically arrayed in the X direction. In the first column, the first sub pixel 49R and the second sub pixel 49G, which are both arranged between the adjacent scan line Gp+1 and the scan line Gp+2, are lined alternately in the Y direction. In the third column, the third sub pixel 49B and the second sub pixel 49G, which are both arranged between the adjacent scan line Gp+1 and the scan line Gp+2, are lined alternately in the Y direction. In the second column and the fourth column, the fourth sub pixel 49W is arranged between the adjacent scan line Gp+1 and the scan line Gp+2, and is lined in the Y direction.

The scan line Gp+1 is coupled to the switching element of the third sub pixel 49B that is one of the third sub pixel 49B and the second sub pixel 49G in the pixel 48B, and is coupled to the switching element of the first sub pixel 49R that is one of the first sub pixel 49R and the second sub pixel 49G in the adjacent pixel 48A. The scan line Gp+1 is further coupled to the switching element of the fourth sub pixel 49W.

The scan line Gp+2 is coupled to the switching element of the second sub pixel 49G that is one of the first sub pixel 49R and the second sub pixel 49G in the pixel 48A, and is coupled to the switching element of the third sub pixel 49B that is one of the third sub pixel 49B and the second sub pixel 49G in the pixel 48B in the next row. The scan line Gp+2 is further coupled to the switching element of the fourth sub pixel 49W.

The scan line Gp+3 is coupled to the switching element of the second sub pixel 49G that is one of the third sub pixel 49B and the second sub pixel 49G in the pixel 48B, and is coupled to the switching element (not depicted) of the first sub pixel 49R that is one of the first sub pixel 49R and the second sub pixel 49G in the pixel 48A in the next row. The scan line Gp+3 is further coupled to the fourth sub pixel 49W.

As just described, out of three of the first sub pixel 49R, the second sub pixel 49G, and the fourth sub pixel 49W included in a single pixel 48A, the second sub pixel 49G is coupled to a scan line different from the other sub pixels. Out of three of the second sub pixel 49G, the third sub pixel 49B, and the fourth sub pixel 49W included in a single pixel 48B, the second sub pixel 49G is coupled to a scan line different from the other sub pixels.

That is, the scan line to which the first sub pixel 49R, which is one of the first sub pixel 49R and the second sub pixel 49G included in a single pixel 48A, and the fourth sub pixel 49W included in that pixel 48A are coupled is different from the scan line to which the second sub pixel 49G that is the other included in that pixel is coupled. The scan line to which the third sub pixel 49B, which is one of the second sub pixel 49G and the third sub pixel 49B included in a single pixel 48B, and the fourth sub pixel 49W included in that pixel 48B are coupled is different from the scan line to which the second sub pixel 49G that is the other included in that pixel is coupled.

The signal line Sq+1 is coupled to the switching elements of the first sub pixels 49R and the third sub pixels 49B of the first column. The signal line Sq+2 is coupled to the switching elements of the second sub pixels 49G of the first column. The signal line Sq+3 is coupled to the switching elements of the fourth sub pixels 49W of the second column. The signal line Sq+4 is coupled to the switching elements of the third sub pixels 49B and the first sub pixels 49R of the third column. The signal line Sq+5 is coupled to the switching elements of the second sub pixels 49G of the third column. The signal line Sq+6 is coupled to the switching element of the fourth sub pixel 49W of the fourth column. The signal line Sq+7 is the same as the signal line Sq+1. The distance between the signal line Sq+2 and the signal line Sq+1 is greater than the distance between the signal line Sq+2 and the signal line Sq+3. Thus, the distance between the signal line Sq+2 and the signal line Sq+1 is different from the distance between the signal line Sq+2 and the signal line Sq+3. The effective aperture width of the first sub pixel 49R or the effective aperture width of the second sub pixel 49G in a single pixel 48A is smaller than the effective aperture width of the fourth sub pixel 49W in the pixel 48A. In the same manner, the distance between the signal line Sq+5 and the signal line Sq+4 is greater than the distance between the signal line Sq+5 and the signal line Sq+6. Thus, the distance between the signal line Sq+5 and the signal line Sq+4 is different from the distance between the signal line Sq+5 and the signal line Sq+6. The effective aperture width of the first sub pixel 49R or the effective aperture width of the second sub pixel 49G in a single pixel 48B is smaller than the effective aperture width of the third sub pixel 49B in the pixel 48B.

By this configuration, between the sub pixels 49 of the first column and the sub pixels 49 of the second column, two of the signal line Sq+2 and the signal line Sq+3 are arranged. Between the sub pixels 49 of the third column and the sub pixels 49 of the fourth column, two of the signal line Sq+5 and the signal line Sq+6 are arranged. The fourth sub pixel 49W is of luminance higher than the first sub pixel 49R, the second sub pixel 49G, and the third sub pixel 49B are, and the influence of the effective aperture width on the luminance is smaller than that of the first sub pixel 49R, the second sub pixel 49G, and the third sub pixel 49B. Thus, by making the effective aperture widths of the first sub pixel 49R, the second sub pixel 49G, and the third sub pixel 49B in the row direction (X direction) larger than the effective aperture width of the fourth sub pixel 49W, the numeral apertures of the first sub pixel 49R, the second sub pixel 49G, and the third sub pixel 49B can be increased. As just described, two of the signal line Sq+2 and the signal line Sq+3 are arranged being biased toward the fourth sub pixel 49W side. In the same manner, the wiring arrangement of two of the signal line Sq+5 and the signal line Sq+6 are arranged being biased toward the fourth sub pixel 49W side.

FIG. 15 illustrates the display data of the intermediate output signal Smid that is output by the data converter 23 illustrated in FIG. 4, and the display data corresponding to the order of panel drive that is the output signal Sout processed by the decimation and color correction unit 24. As illustrated in FIGS. 13 and 14, the scanning circuit 42, as a control device, transmits an image signal to be transmitted to the second sub pixels 49G in the first column by shifting by one horizontal line of pixels (one row) from the image signal to be transmitted to the first sub pixels 49R of the same pixels 48 in which the second sub pixel 49G is present. The scanning circuit 42, as the control device, transmits an image signal to be transmitted to the second sub pixels 49G in the first column by shifting by one horizontal line of pixels (one row) from the image signal to be transmitted to the third sub pixels 49B of the same pixels 48B in which the second sub pixel 49G is present. Consequently, the decimation and color correction unit 24 illustrated in FIG. 4 performs decimation and color correction to shift the image signal to be transmitted to the second sub pixels 49G in the first row or the third row by one horizontal line of pixels (one row) from the image signal to be transmitted to the first sub pixels 49R of the same pixels 48A and the third sub pixel 49B of the pixels 48B in which the second sub pixel 49G is present.

Second Modification

Figure 16:
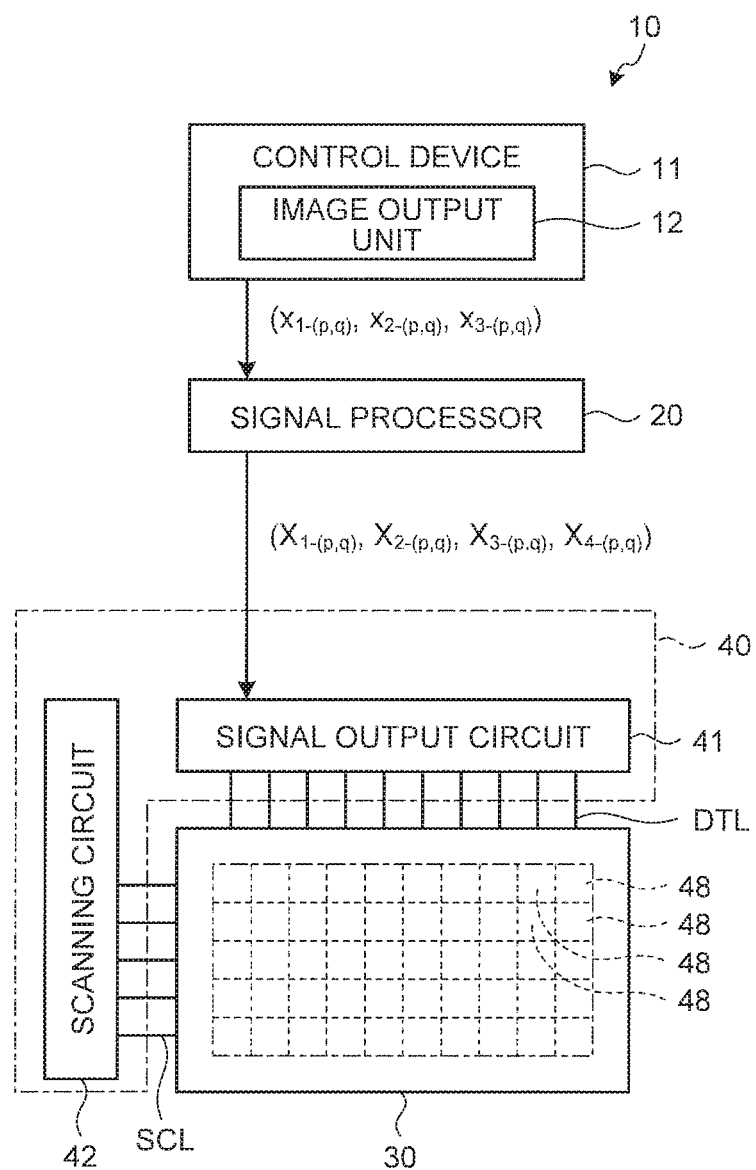
FIG. 16 is a block diagram illustrating one example of the configuration of a display device according to a second modification of the embodiment.
Figure 17:
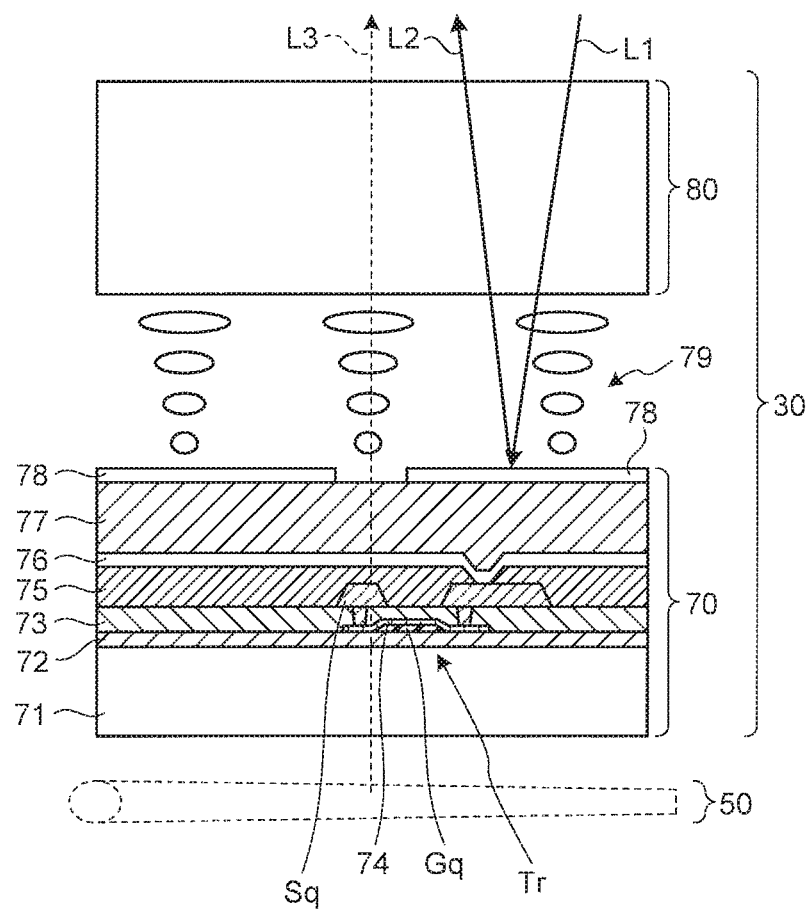
FIG. 17 is a schematic diagram for schematically explaining a cross-section of the image display panel in the second modification of the embodiment.
Figure 18:
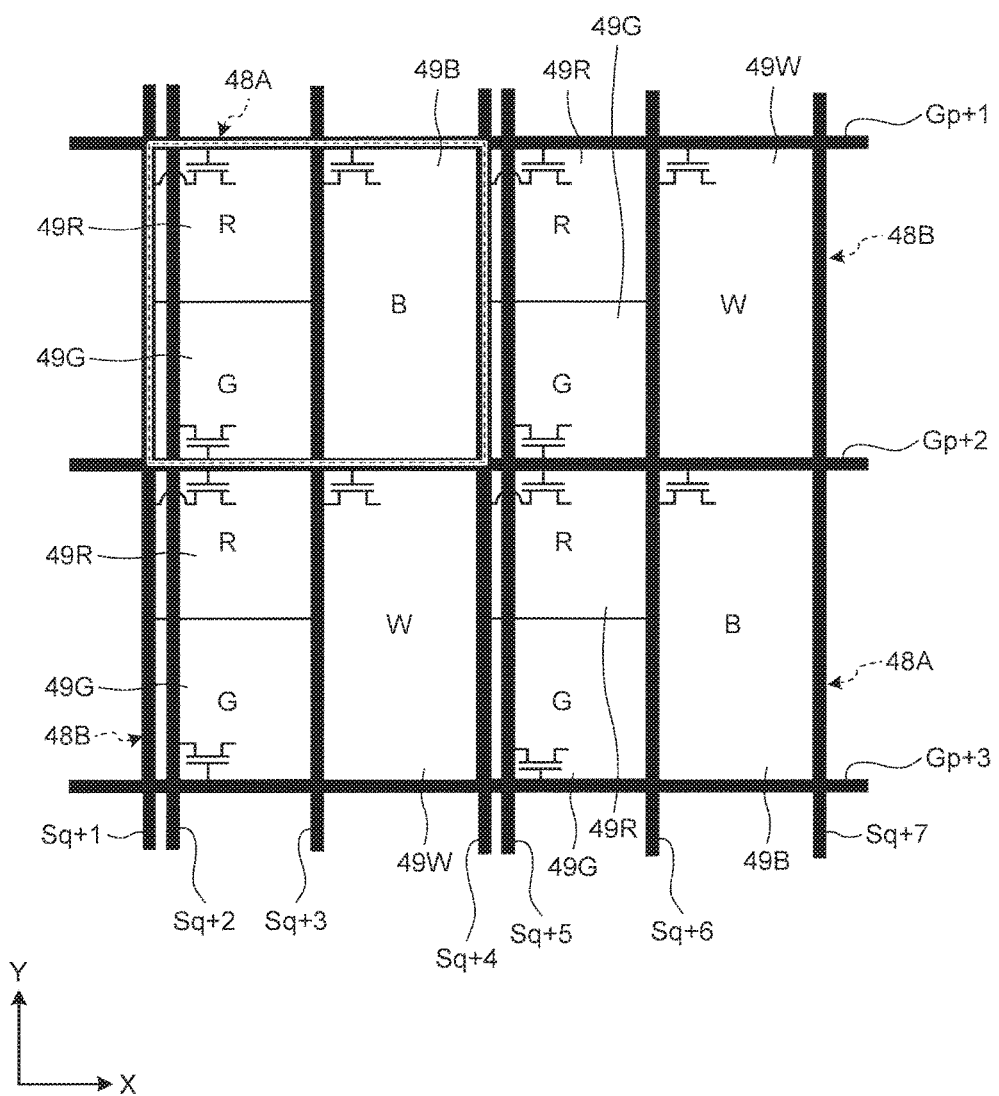
FIG. 18 is a diagram illustrating a pixel array of the image display panel in the second modification of the embodiment.

FIG. 16 is a block diagram illustrating one example of the configuration of a display device according to a second modification of the embodiment. FIG. 17 is a schematic diagram for schematically explaining a cross-section of the image display panel in the second modification of the embodiment. FIG. 18 is a diagram illustrating a pixel array of the image display panel in the second modification of the embodiment. For the constituent elements the same as those in the foregoing, the detailed explanations will be omitted.

As illustrated in FIG. 16, the display device 10 in the second modification of the embodiment includes the signal processor 20 that receives an input signal (RGB data) from the image output unit 12 of the control device 11 and outputs it by performing a given data conversion processing, the image display panel 30 that displays an image based on the output signal output from the signal processor 20, and the image-display-panel drive circuit 40 that controls the drive of the image display panel 30 (display unit). The display device 10 in the second modification of the embodiment is a reflective display device, and images can be displayed on the image display panel 30 by the light of a front light or by the environmental light from the outside.

As illustrated in FIG. 17, the image display panel 30 includes a first substrate (pixel substrate) 70, a second substrate (counter substrate) 80 that is arranged facing the surface of the first substrate 70 in a perpendicular direction, and a liquid crystal layer 79 that is provided in an inserted manner between the first substrate 70 and the second substrate 80. In the above-described embodiment, in the image display panel 30, the light source device 50 is arranged on the side of the first substrate (pixel substrate) 70 opposite to the liquid crystal layer 79. However, the image display panel in the second modification does not include the light source device 50.

The first substrate 70 is a substrate on which various circuits are formed on a translucent substrate 71, and on the translucent substrate 71, includes a plurality of first electrodes (pixel electrode) 78, which are arranged in a matrix, and a second electrode (common electrodes) 76. As illustrated in FIG. 17, the first electrodes 78 and the second electrode 76 are insulated by an insulating layer 77 and face each other in the direction perpendicular to the surface of the translucent substrate 71. The first electrodes 78 and the second electrode 76 are translucent electrodes formed of translucent conductive material (translucent conductive oxide) such as indium tin oxide (ITO).

When a thin-film transistor that is the switching element of each of the above-described sub pixels 49 is assumed as a transistor Tr, the first substrate 70 has a semiconductor layer in which the transistor Tr, which is the switching element of each of the above-described sub pixels 49, is formed and wiring such as signal lines Sq ($0 \leq q \leq m$) that supply a pixel signal to each of the first electrodes 78 and scan lines Gp ($0 \leq p \leq n$) that drive the transistor Tr, being layer-stacked on the translucent substrate 71 and insulated by insulating layers 72, 73, and 75.

In the display device 10 in the second modification of the embodiment, as illustrated in FIG. 3, the pixel 48A includes, out of the first sub pixel 49R, the second sub pixel 49G, the third sub pixel 49B, and the fourth sub pixel 49W, three of the first sub pixel 49R, the second sub pixel 49G, and the third sub pixel 49B. The pixel 48B includes, out of the first sub pixel 49R, the second sub pixel 49G, the third sub pixel 49B, and the fourth sub pixel 49W, three of the first sub pixel 49R, the second sub pixel 49G, and the fourth sub pixel 49W. The image display panel 30 includes the scan lines Gp+1, Gp+2, and Gp+3 extending in the X direction and the signal lines Sq+1, Sq+2, Sq+3, Sq+4, Sq+5, Sq+6, and Sq+7 extending in the Y direction. The display device 10 in the second modification of the embodiment can increase, by arranging the pixels 48A and the pixels 48B as illustrated in FIG. 3, the reflectivity of reflected light L2 that is incident light L1 reflected on the first electrodes 78 in high-definition, even when transmitted light L3 of the light source device 50 is not used.

As illustrated in FIG. 17, the signal lines Sq ($0 \leq q \leq m$) are hard to affect the first electrodes 78 that act as reflectors. Consequently, without considering the effect in which the transmitted light L3 of the light source device 50 is masked by the signal lines Sq ($0 \leq q \leq m$), the arrangement of the pixels 48A and the pixels 48B as illustrated in FIG. 18 is also possible, for example.

As illustrated in FIG. 18, between the sub pixels 49 of the first column and the sub pixels 49 of the second column, a single signal line Sq+3 is arranged. Between the sub pixels 49 of the second column and the sub pixels 49 of the third column, two of the signal line Sq+4 and the signal line Sq+5 are arranged. Between the sub pixels 49 of the third column and the sub pixels 49 of the fourth column, a single signal line Sq+6 is arranged. The distance between the signal line Sq+2 and the signal line Sq+1 is smaller than the distance between the signal line Sq+2 and the signal line Sq+3. Thus, the distance between the signal line Sq+1 and the signal line Sq+3 is substantially the same as the distance between the signal line Sq+2 and the signal line Sq+3. In the same manner, the distance between the signal line Sq+4 and the signal line Sq+6 is substantially the same as the distance between the signal line Sq+5 and the signal line Sq+6. In the case of a reflective liquid crystal display such as the display device 10 in the second modification of the embodiment, as illustrated in FIG. 17, because it has a reflecting layer (the first electrodes 78 in this example) between the signal lines and the display surface, the positions of the signal lines have no effect on the luminance of the external light. Consequently, the positions of the signal lines are arbitrary, and the signal lines may be arranged in an equal distance so as to run through the middle of the respective sub pixels.

In the display device 10 in the second modification of the embodiment, the second electrode (common electrodes) may be arranged an upper side. One of the first electrodes and the second electrode may be formed as a reflecting electrode. In the display device 10 in the second modification of the embodiment, one of the first electrodes 78 and the second electrode 76 may be arranged on the second substrate 80 and driven by a longitudinal electric field. As in the foregoing, the display device 10 in the embodiment may be reflective or transmissive, and the drive system of liquid crystals may be a transverse electric field or a longitudinal electric field.

Application Examples

Figure 19:
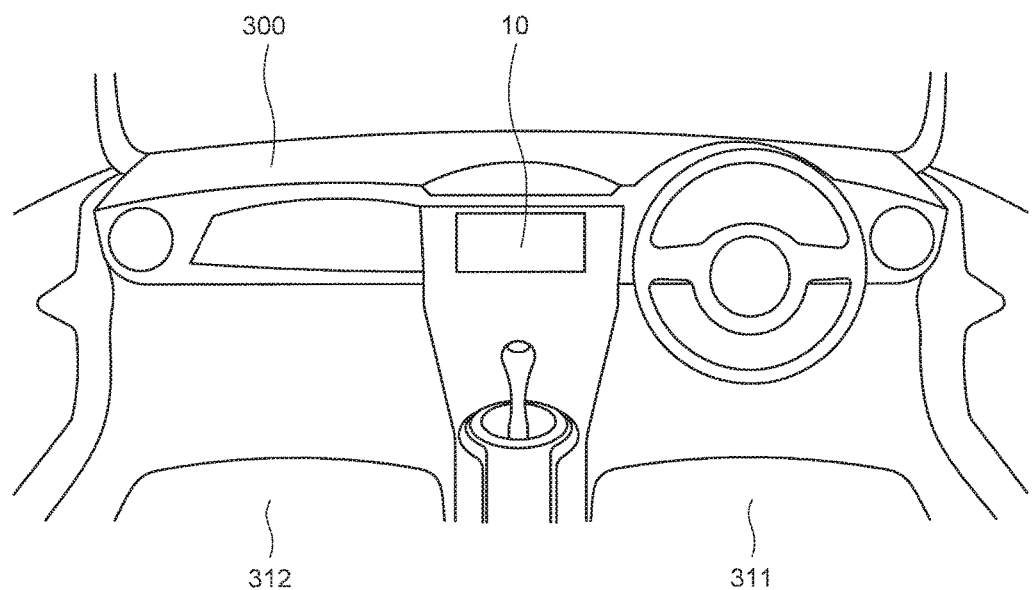
FIG. 19 is a diagram illustrating one example of an electronic apparatus including the display device in the embodiment.
Figure 20:
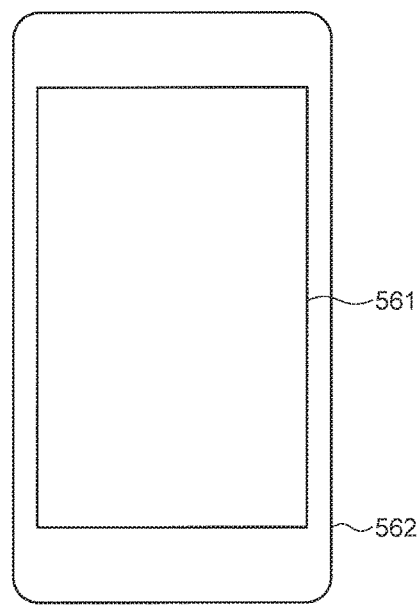
FIG. 20 is a diagram illustrating one example of an electronic apparatus including the display device in the embodiment.

With reference to FIGS. 19 and 20, the application examples of the display device 10 exemplified in the embodiment and the modifications will be described. FIGS. 19 and 20 are diagrams illustrating examples of an electronic apparatus including the display device in the embodiment. The display device 10 in the embodiment can be applied to electronic apparatuses in all areas including car navigation systems such as one illustrated in FIG. 19, television apparatuses, digital cameras, notebook computers, handheld terminal devices such as a cellular phone illustrated in FIG. 20, and video cameras. In other words, the display device 10 in the embodiment can be applied to the electronic apparatuses in all areas that display a video signal received from the outside or generated internally, as an image or a video. The electronic apparatus includes the control device 11 (see FIG.

1) that supplies a video signal to the display device and controls the operation of the display device.

The electronic apparatus illustrated in FIG. 19 is a car navigation apparatus to which the display device 10 in the embodiment and the modifications is applied. The display device 10 is installed on a dashboard 300 inside a vehicle. Specifically, it is installed on the dashboard 300 between a driver seat 311 and a passenger seat 312. The display device 10 of the car navigation apparatus is used for navigation display, music operation screen display, movie reproduction display, and others.

The electronic apparatus illustrated in FIG. 20 is an information portable terminal, to which the display device 10 according to the embodiment and the modifications thereof is applied, which operates as a portable computer, a multifunctional cellular phone, a mobile computer allowing a voice communication, or a communicable portable computer, and may be called a smartphone or a tablet terminal in some cases. This information portable terminal includes a display unit 561 on a surface of a housing 562, for example. The display unit 561 includes the display device 10 according to the embodiment and the modifications thereof and a touch detection (what is called a touch panel) function that can detect an external proximity object.

The embodiment is not limited to the above description. The components according to the embodiment described above include a component that is easily conceivable by those skilled in the art, substantially the same component, and what is called an equivalent. The components can be variously omitted, replaced, and modified without departing from the gist of the embodiment described above.

What is claimed is:

1. A display device comprising:
   a plurality of sub pixels including a first sub pixel, a second sub pixel, and a third sub pixel; and
   a plurality of signal lines extending in a first direction, wherein
   in the first direction or a second direction that intersects with the first direction, a width of the first sub pixel is smaller than a width of the third sub pixel, and a width of the second sub pixel is smaller than the width of the third sub pixel,
   of the plurality of signal lines, a first signal line coupled to a switching element of the second sub pixel has a first distance to a second signal line that is coupled to a switching element of the first sub pixel, and a second distance to a third signal line that is coupled to a switching element of the third sub pixel, and
   the first distance is different than the second distance.

2. The display device according to claim 1, wherein:
   the plurality of sub pixels further includes a fourth sub pixel, and
   a first pixel includes the first sub pixel, the second sub pixel, and the third sub pixel, and a second pixel includes the first sub pixel, the second sub pixel, and the fourth sub pixel.

3. The display device according to claim 2, wherein:
   the third sub pixel corresponds to blue, and the fourth sub pixel corresponds to white.

4. The display device according to claim 1, wherein the first sub pixel and the second sub pixel are located in a same column and are alternatingly arranged in the first direction.

5. The display device according to claim 1, wherein an effective aperture width of the first sub pixel or an effective aperture width of the second sub pixel is smaller than an effective aperture width of the third sub pixel.

6. The display device according to claim 1, further comprising a plurality of scan lines extending in the second direction, wherein
   one or two sub pixels of the first sub pixel, the second sub pixel, and the third sub pixel are coupled to a scan line different from that of the remaining sub pixels.

7. The display device according to claim 1, further comprising a control device that transmits a plurality of image signals to the plurality of signal lines, wherein
   the control device transmits a first image signal of the plurality of image signals to be transmitted to the second sub pixel by shifting one horizontal line of pixels from a second image signal of the plurality of image signals to be transmitted to the first sub pixel.

8. A display device comprising:
   a plurality of pixels including a first pixel and a second pixel,
   the first pixel including a first red sub pixel, a first green sub pixel, and a blue sub pixel, and
   the second pixel including a second red sub pixel, a second green sub pixel, and a white sub pixel, wherein,
   in a first direction or a second direction that intersects with the first direction, a width of the first red sub pixel is smaller than a width of the blue sub pixel, and a width of the first green sub pixel is greater than the width of the blue sub pixel, and
   in the first direction or the second direction, a width of the second red sub pixel is smaller than a width of the white sub pixel, and a width of the second green sub pixel is greater than the width of the white sub pixel.

9. The display device according to claim 8, wherein:
   the first red sub pixel, the first green sub pixel, the second red subpixel, and the second green sub pixel are located to a same column and are alternatingly arranged in the first direction.

10. The display device according to claim 8, further comprising a plurality of signal lines extending in the first direction, wherein
    of the plurality of signal lines, a first signal line coupled to a switching element of the first green sub pixel has a first distance to a second signal line that is coupled to a switching element of the first red sub pixel, and a second distance to a third signal line that is coupled to a switching element of the blue sub pixel, and
    the first distance is different than the second distance.

11. The display device according to claim 8, further comprising a plurality of signal lines extending in the first direction, wherein
    of the plurality of signal lines, a first signal line coupled to a switching element of the second green sub pixel has a first distance to a second signal line that is coupled to a switching element of the second red sub pixel, and a second distance to a third signal line that is coupled to a switching element of the white sub pixel, and
    the first distance is different than the second distance.

12. The display device according to claim 8, wherein an effective aperture width of the first red sub pixel or an effective aperture width of the first green sub pixel is smaller than an effective aperture width of the blue sub pixel.

13. The display device according to claim 8, further comprising a plurality of scan lines extending in the second direction, wherein
one or two sub pixels of the first red sub pixel, the first green sub pixel, and the blue sub pixel are coupled to a scan line different from that of the remaining sub pixels.

14. The display device according to claim 8, further comprising a control device that transmits a plurality of image signals to the plurality of signal lines, wherein
the control device transmits a first image signal of the plurality of image signals to be transmitted to the first green sub pixel by shifting by one horizontal line of pixels from a second image signal of the plurality of image signals to be transmitted to the first red sub pixel.

15. A display device comprising:
a plurality of pixels including a first pixel and a second pixel,
the first pixel including a first red sub pixel and a first green sub pixel located in a first column, and a blue sub pixel located in a second column adjacent the first column, and
the second pixel including a second red subpixel and a second green sub pixel located in a third column adjacent the second column, and a white sub pixel located in a fourth column adjacent the third column; and
a plurality of signal lines extending in a first direction that lies along at least one of the first column, the second column, the third column, or the fourth column, wherein
the first column, the second column, the third column, and the fourth column are cyclically arrayed, and
the first red sub pixel, the second red sub pixel, the first green sub pixel, the second green sub pixel, the blue sub pixel, and the white sub pixel are located in a same row of the plurality of pixels.

16. The display device according to claim 15, wherein:
of the plurality of signal lines, a first signal line coupled to a switching element of the first green sub pixel has a first distance to a second signal line that is coupled to a switching element of the first red sub pixel, and a second distance to a third signal line that is coupled to a switching element of the blue sub pixel, and
the first distance is different than the second distance.

17. The display device according to claim 15, wherein:
of the plurality of signal lines, a first signal line coupled to a switching element of the second green sub pixel has a first distance to a second signal line that is coupled to a switching element of the second red sub pixel, and a second distance to a third signal line that is coupled to a switching element of the white sub pixel, and
the first distance is different than the second distance.

18. The display device according to claim 15, wherein:
an effective aperture width of the first red sub pixel or an effective aperture width of the first green sub pixel is smaller than an effective aperture width of the blue sub pixel.

19. The display device according to claim 15, wherein:
one or two sub pixels of the first red sub pixel, the first green sub pixel, and the blue sub pixel are coupled to a scan line different from that of the remaining sub pixels.

20. The display device according to claim 15, further comprising a control device that transmits a plurality of image signals to the plurality of signal lines, wherein
the control device transmits a first image signal of the plurality of image signals to be transmitted to the first green sub pixel by shifting by one horizontal line of pixels from a second image signal of the plurality of image signals to be transmitted to the first red sub pixel.

* * * * *